United States Patent [19]
Ohmori et al.

[11] Patent Number: 5,437,361
[45] Date of Patent: Aug. 1, 1995

[54] ARTICLE CONVEYOR UNIT

[75] Inventors: Toshiyuki Ohmori; Shigemi Hatanaka, both of Chiba; Yasuhiro Homma, Saitama; Eiichi Saito, Chiba; Nobuyuki Kamishioiri, Tochigi, all of Japan

[73] Assignee: KAO Corporation, Tokyo, Japan

[21] Appl. No.: 224,676

[22] Filed: Apr. 7, 1994

[30] Foreign Application Priority Data

Apr. 8, 1993 [JP] Japan .................................. 5-104955

[51] Int. Cl.6 ...................... B65G 17/46; B67B 3/062; B67B 3/064; B65B 7/28
[52] U.S. Cl. .................................. 198/465.1; 53/471; 53/282; 53/306; 53/308; 198/803.01; 198/803.12; 198/803.7
[58] Field of Search ................ 53/471, 490, 300, 307, 53/308, 317, 281, 282; 198/803.01, 803.7, 465.1, 803.12, 689.1, 493, 350

[56] References Cited

U.S. PATENT DOCUMENTS

| | | | |
|---|---|---|---|
| 3,006,455 | 10/1961 | Dudnick | 198/803.12 X |
| 3,090,478 | 5/1963 | Stanley | 198/803.01 X |
| 3,342,304 | 9/1967 | Greulich | 198/803.01 X |
| 3,422,597 | 1/1969 | Beer | 53/307 X |
| 3,621,979 | 11/1971 | Kraeft | 198/803.01 |
| 3,707,825 | 1/1973 | Bell et al. | 53/282 |
| 3,941,237 | 5/1976 | MacGregor, Jr. | 198/803.01 |
| 4,901,504 | 2/1990 | Tsuji et al. | 53/308 X |
| 5,095,681 | 3/1992 | Choi | 53/308 X |
| 5,284,001 | 2/1994 | Ochs | 53/307 |
| 5,339,600 | 8/1994 | Hamano et al. | 53/308 X |

FOREIGN PATENT DOCUMENTS 0535946 7/1993 European Pat. Off. .
158496 4/1989 Japan .

*Primary Examiner*—Horace M. Culver
*Attorney, Agent, or Firm*—Dvorak and Traub

[57] ABSTRACT

A filling method is disclosed, which comprises a step of filling a content into a bottle 1 and a step of fitting a cap 2 on the bolt 1 with the content charged thereinto. The bottle 1 is conveyed in a state held by a bottle container 3 on a conveyor, while the cap 2 is conveyed in a state held by a cap holder 4 on a conveyor.

20 Claims, 19 Drawing Sheets

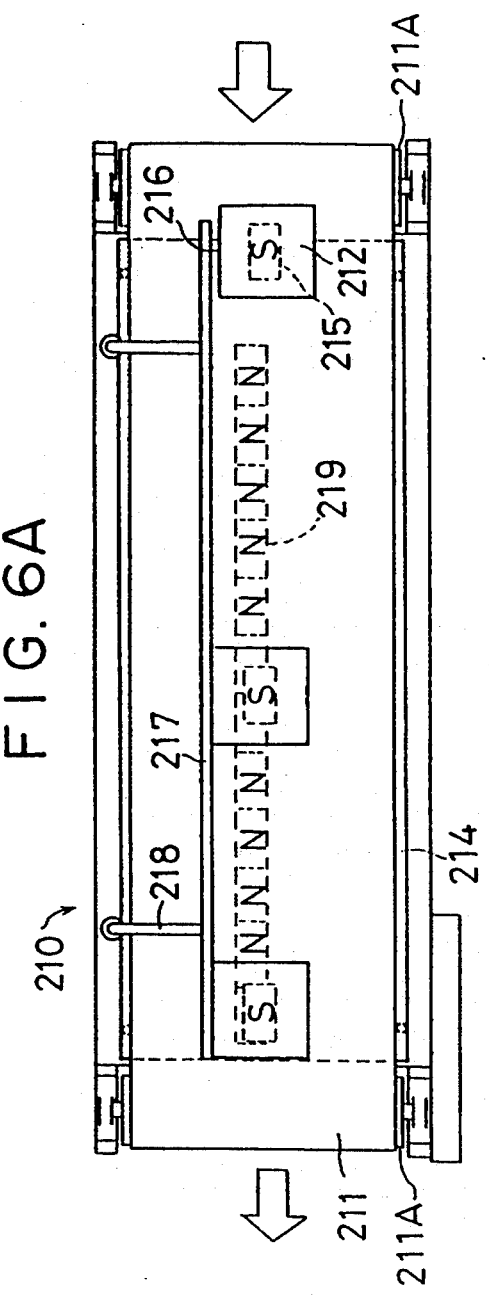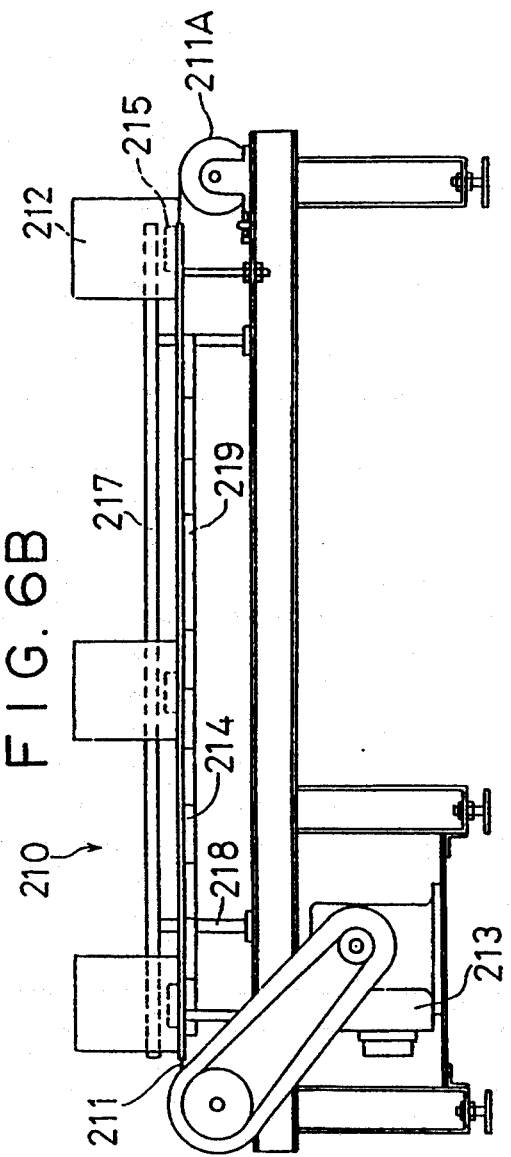

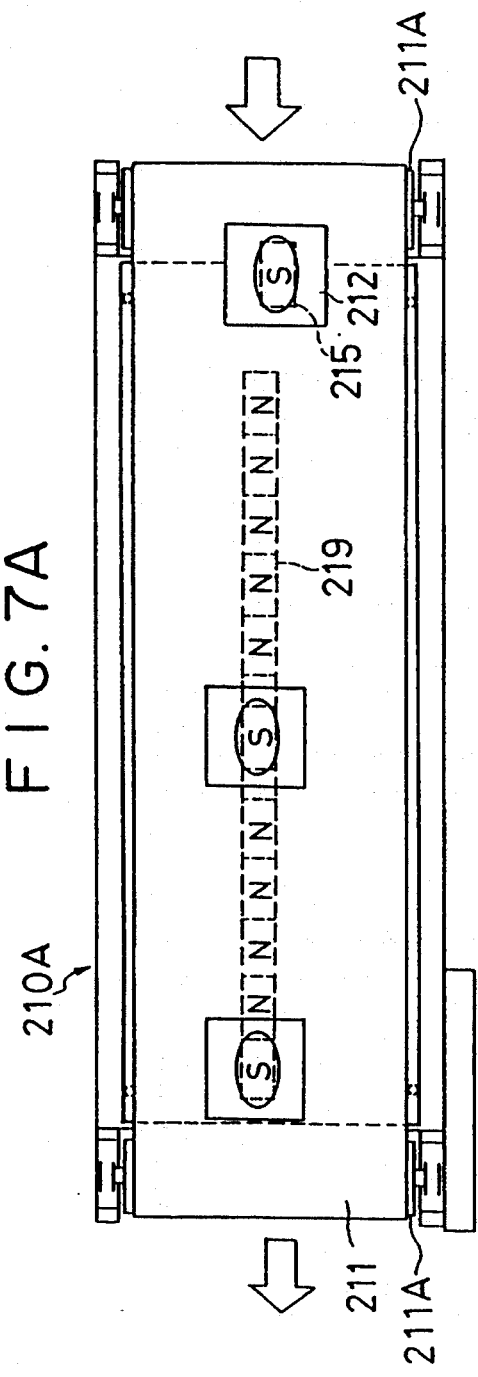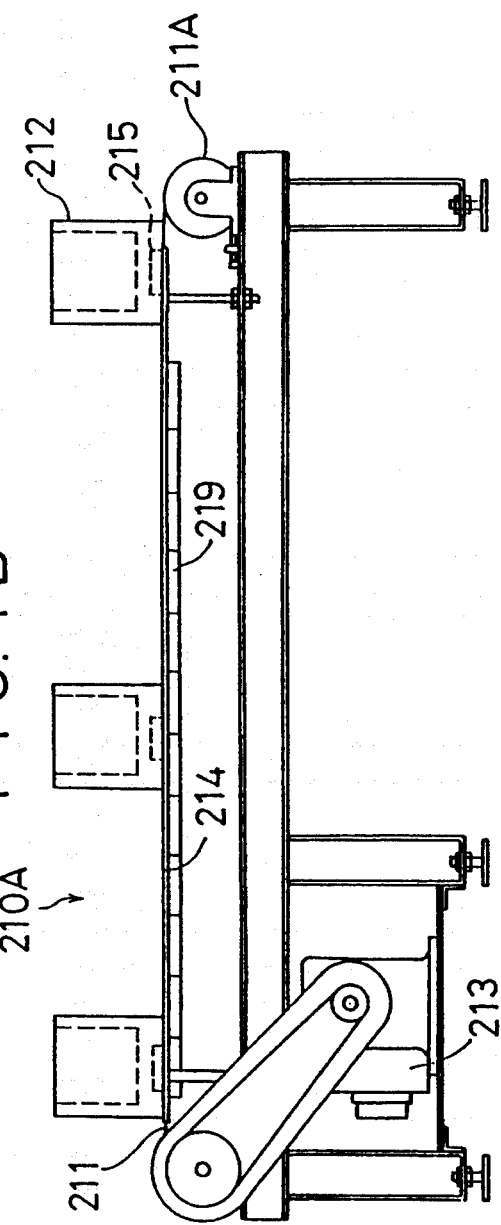

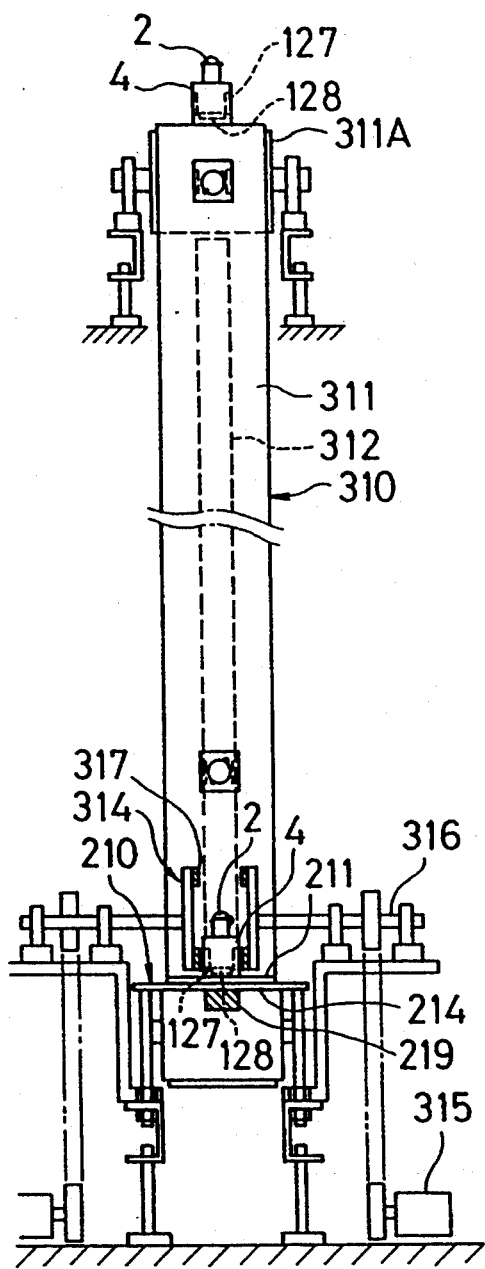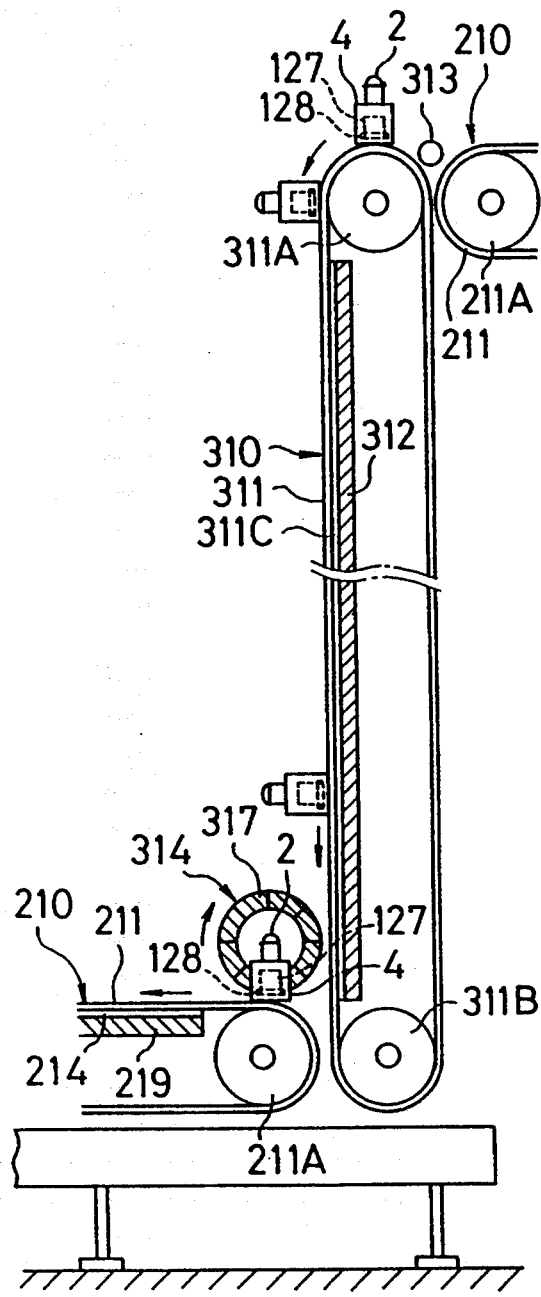

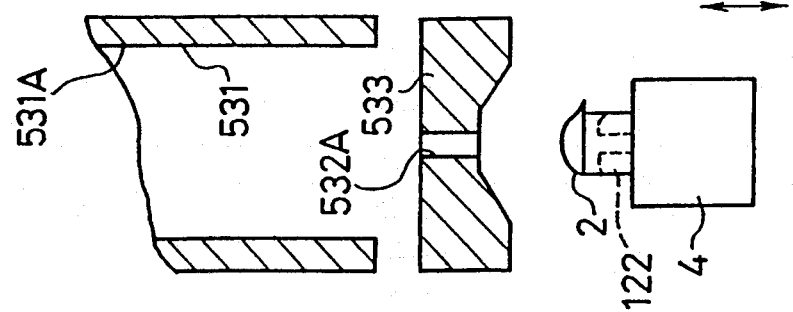
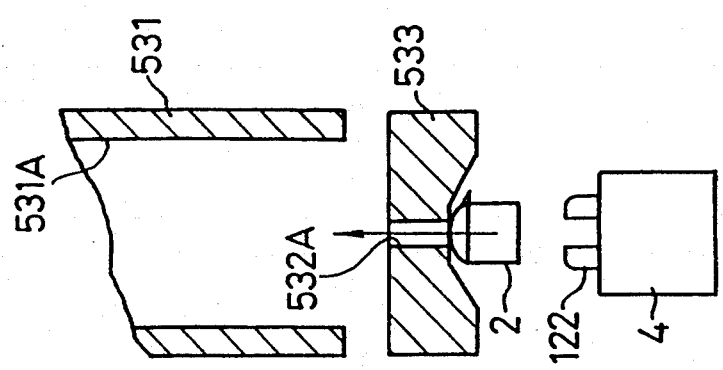
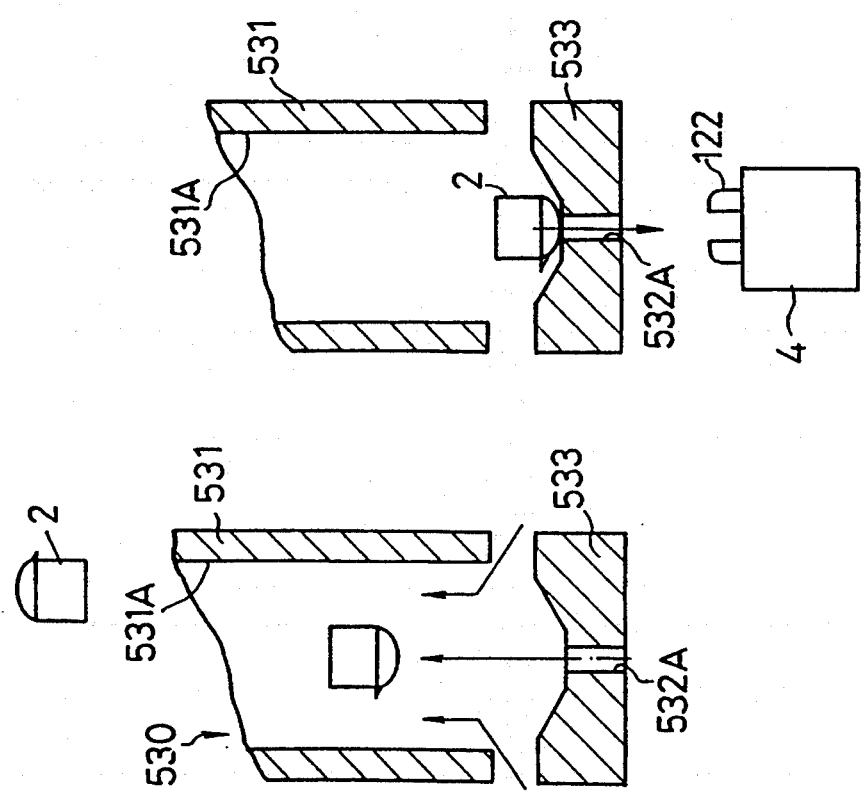

ARTICLE CONVEYOR UNIT

BACKGROUND OF THE INVENTION

1. Field of the Invention

The present invention relates to a method and an apparatus for filling such contents as cleanser, edible oil, etc., into a container and attaching a closing member on the container.

2. Description of the Background Art

Japanese Utility Model Laid-Open Publication H1-58498 discloses a method of filling, which comprises a step of filling a content into a bottle (container) and a step of fitting a cap (closing member) on the bottle with the content therein.

In the prior art, bottles in a holder are each conveyed on a conveyor, while caps are directly conveyed on a slide chute.

Thus, bottles, conveyed on a conveyor, can be fed at a predetermined conveying speed and in a constant conveying position to a filling unit and also to a cap fitting unit. In other words, the bottles can be fed reliably in a timed relation to the cycle of operation of the filling and cap fitting units. In addition, the bottles can be fed such that they are stable in a predetermined filling position in the filling unit and a predetermined cap fitting position in the cap fitting unit.

In the prior art, however, caps which are fed directly on a sliding chute, are difficult to be fed in a stable condition at a predetermined conveying speed. That is, it is likely that caps become jammed on the chute or that the feeding sequence of the caps to the cap fitting unit is interrupted. Further, the caps can not be reliably conveyed in a predetermined conveying position, and it is difficult to obtain a reliable predetermined fitting position of the caps in the cap fitting unit.

SUMMARY OF THE INVENTION

It is an object of the invention that when filling contents into containers and fitting closing members thereon, the containers are fed at a predetermined conveying speed and in a predetermined conveying position to the filling and closing member fitting units, while the closing members are fed at a predetermined conveying speed and at a predetermined conveying position to the closing member fitting unit.

According to the invention, there is provided a method of filling, which comprises a step of filling contents into a container and a step of fitting a closing member onto the container with the contents therein to close the opening of the container, the container being conveyed in a state held by a container holder on a conveyor, the closing member being conveyed in a state held by a closing member holder on a conveyor.

According to the invention, there is provided an apparatus for filling, which comprises a filling unit for filling contents into a container, a closing member fitting unit for fitting a closing member on the container with the contents therein to close the container, a container conveyor, container holders carried by the container conveyor and each able to hold a container from a container feed unit via the filling unit, the closing member fitting unit and a container take-out unit, back to the container supply unit, and a closing member conveyor, and a closing member conveyor, closing member holders carried by the closing member conveyor and each able to hold a closing member from a closing member supply unit via the closing member fitting unit, back to the closing member supply unit.

According to the invention, the following functions and effects are obtainable.

Since containers are conveyed in a state held by container holders on a conveyor, they can be fed at a predetermined conveying speed and in a predetermined conveying position to the filling and closing member fitting units. Specifically, the containers can be fed such that they are reliably timed to the operation cycle of the filling and closing member fitting units. In addition, they are fed such that they are stable in a predetermined filling position in the filling unit and in a predetermined closing member fitting position in the closing member fitting unit.

Closing members, which are conveyed by closing member holders on a conveyor, can be fed at a predetermined conveying speed and in a predetermined conveying position to the closing member fitting unit. Specifically, they can be fed such that they are reliably timed to the operation cycle of the closing member fitting unit. In addition, they can be fed such that they are stable in a predetermined closing member fitting position in the closing member fitting unit.

With the functions and effects in explained above, it is possible to improve the reliability and production control performance of the whole filling apparatus.

BRIEF DESCRIPTION OF THE DRAWINGS

The present invention will be more fully understood from the detailed description given below and from the accompanying drawings which should not be taken to be a limitation on the invention, but for explanation and understanding only.

The drawings:

FIGS. 6A and 6B are schematic views showing a horizontal conveyor unit;

FIGS. 7A and 7B are schematic views showing a different horizontal conveyor unit;

FIGS. 10A and 10B are schematic views showing a vertical conveyor unit;

FIGS. 22A to 22D are schematic views illustrating a cap position control method;

DESCRIPTION OF THE PREFERRED EMBODIMENT

Figure 1:
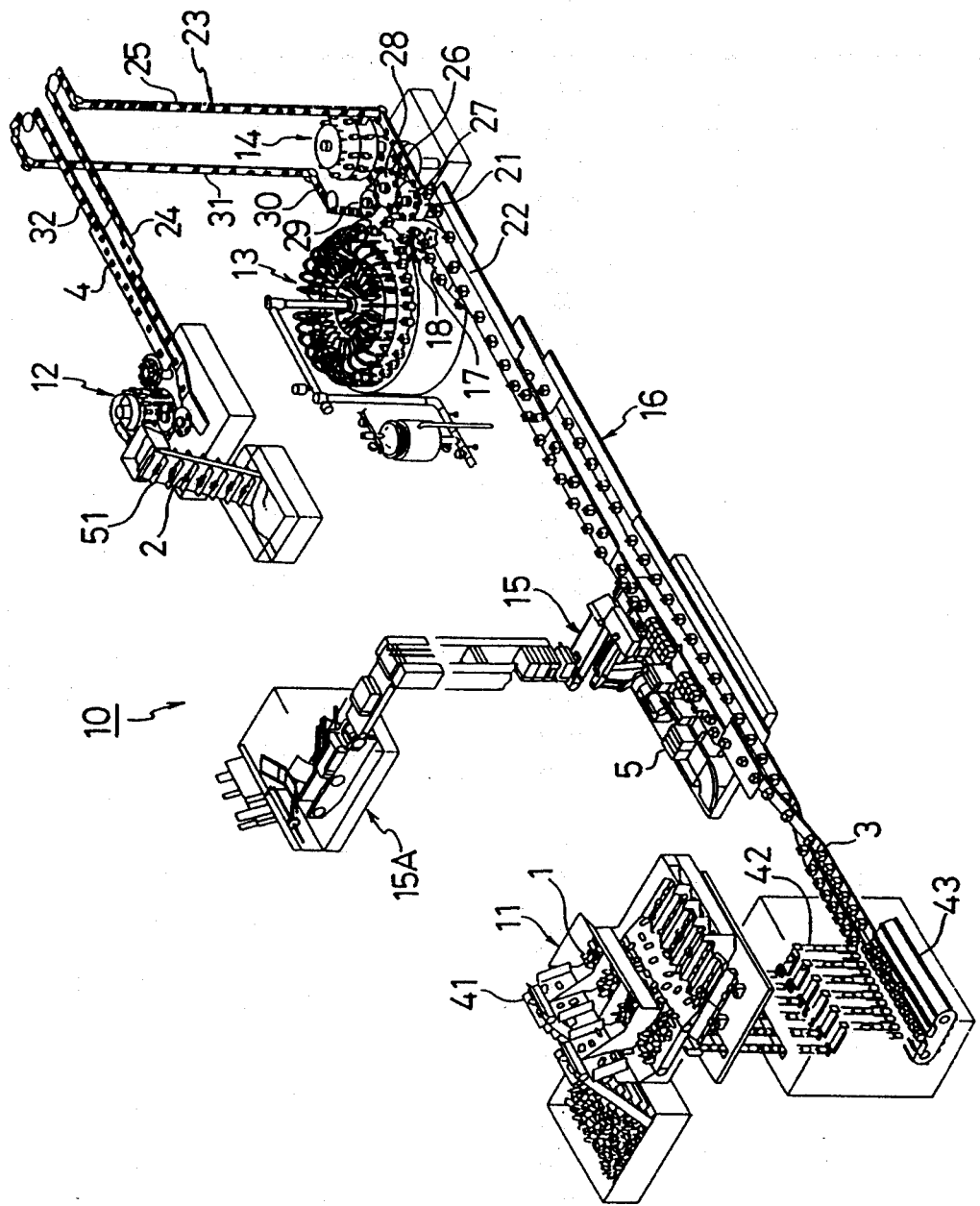
FIG. 1 is a schematic view showing an apparatus for filling.

FIG. 1 shows a filling apparatus designated at 10 embodying the invention. As shown, the apparatus comprises a bottle aligner/feeder (container feeder) 11, a cap aligner/feeder (closing member feeder) 12, a filling unit 13, a cap fitting unit (closing member fitting unit) 14 and a packing unit (container take-out unit) 15. The bottle aligner/feeder 11 aligns bottles (containers) 1 to be in a predetermined feeding position and then feeds the same to bottle holders (container holders) 3. The cap aligner/feeder 12 aligns caps (closing members) 2 to be in a predetermined position and then feeds the same to cap holders (closing member holders) 4. The filling unit 13 charges contents, such as cleanser, edible oil, etc., into the bottles 1 held by the bottle holders 3. The cap fitting unit 14 receives the caps 2 held by the cap holders 4 and fits these caps 2 on the bottles 1 with the contents therein. The packing unit 15 packs the bottles 1 with the caps 2 fitted thereon in boxes 5. The boxes 5 are produced in a box producing unit 15A.

Figure 2:
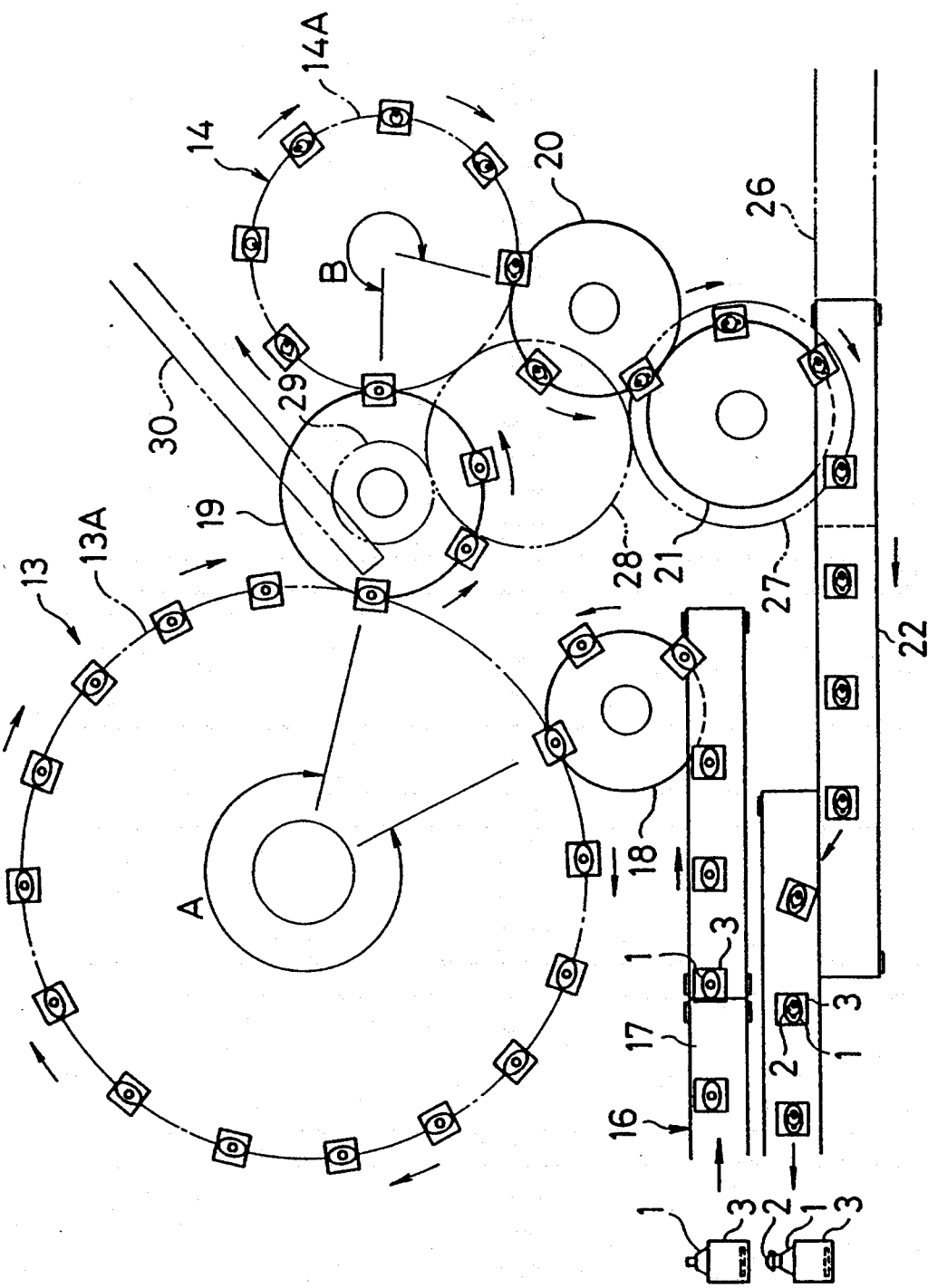
FIG. 2 is a schematic view showing a bottle conveying line.

The filling apparatus 10 includes a bottle conveying line (container conveyor) 16, which circulates past the bottle aligner/feeder 11, filling unit 13, cap fitting unit 14 and packing unit 15 (FIGS. 1 and 2). The bottle conveying line 16 has a horizontal conveyor unit 17 and an article transfer unit 18, these units extending from the bottle aligner/feeder 11 to the filling unit 13, a revolving conveyor unit 19 extending from the filling unit 13 to the cap fitting unit 14, and a revolving conveyor unit 20, an article transfer unit 21 and a horizontal conveyor unit 22, these units extending from the cap fitting unit 14 to the packing unit 15 and bottle aligner/feeder 11. The bottle conveying line 16 conveys bottle holders 3 in a circulatory path. Specifically, it conveys bottle holders 3 with bottles 1 held therein from the bottle aligner/feeder 11 via a revolving conveyor unit 13A of the filling unit 13 and a revolving conveyor unit 14A of the cap fitting unit 14, to the packing unit 15, and conveys bottle holders 3 after removal of bottles 1 therefrom in the packing unit 15, to the bottle aligner/feeder 11.

Figure 3:
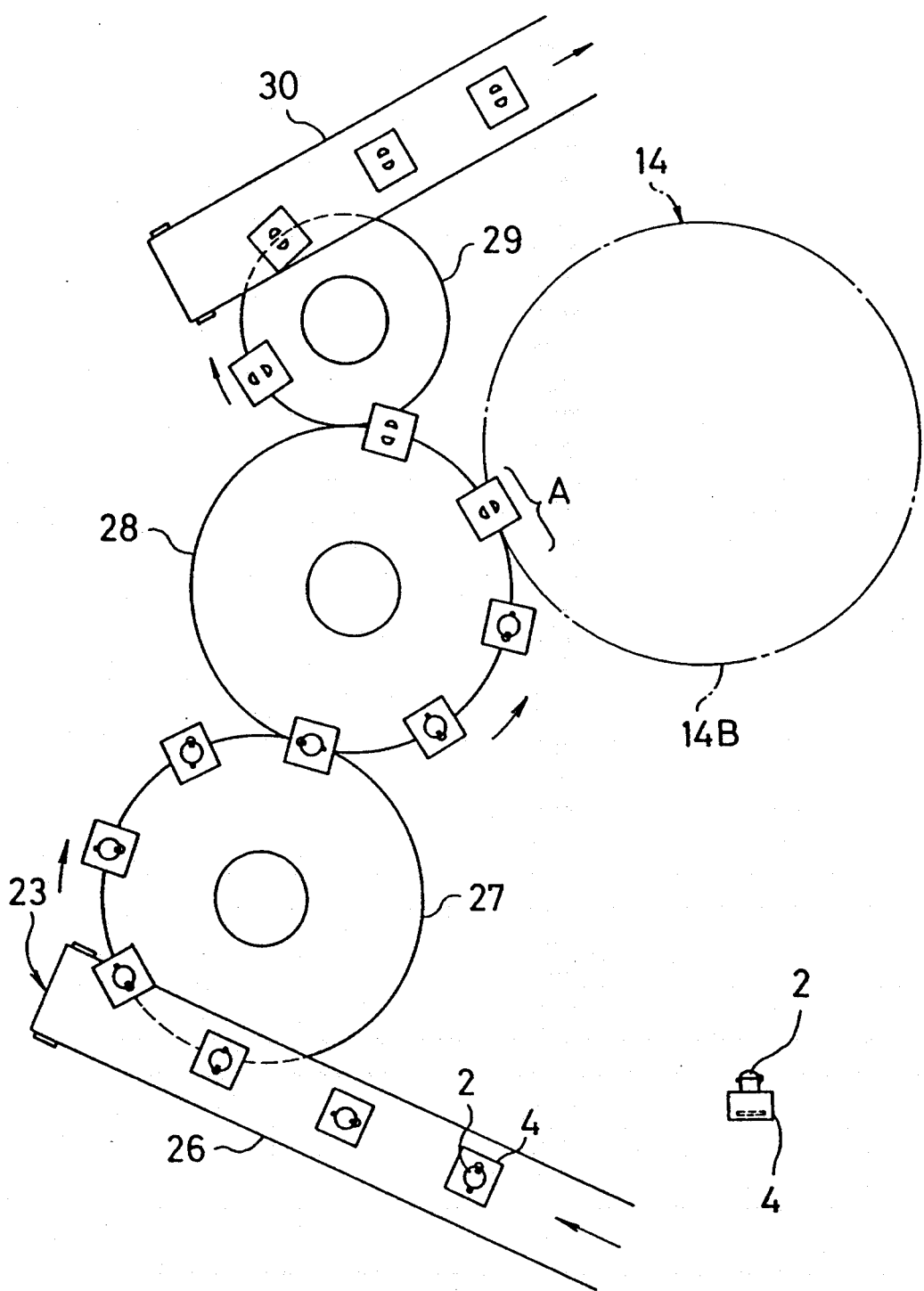
FIG. 3 is a schematic view showing a cap conveying line.

The filling apparatus 10 further includes a cap conveying line (closing member conveyor) 23, which circulates past the cap aligner/feeder 12 and cap fitting unit 14 (FIGS. 1 and 3). The cap conveying line 23 has a horizontal conveyor unit 24, a vertical conveyor unit 25, a horizontal conveyor unit 26, an article transfer unit 27 and a revolving conveyor unit 28, these units extending from the cap aligner/feeder 12 to the cap fitting unit 14. It also has a revolving transfer unit 28, an article transfer unit 29, a horizontal conveyor unit 30, a vertical conveyor unit 31 and a horizontal conveyor unit 32, these units extending from the cap fitting unit 14 to the cap aligner/feeder 12. The horizontal conveyor, article transfer, revolving conveyor, article transfer and horizontal transfer units 26 to 30 in the cap conveying line 23, partly overlap the bottle conveying line 16 in plan view, as shown in FIG. 2, but they are at a higher level than and do not interfere with the bottle conveying line 16. The cap conveying line 23 conveys cap holders 4 in a circulatory fashion. Specifically, it conveys cap holders 4 with caps 2 held thereby from the cap aligner/feeder 2 to the revolving conveyor unit 14B of the cap fitting unit 14, and also conveys cap holders 4 after removal of caps 2 in the cap fitting unit 14 back to the cap aligner/feeder 12.

The bottle holder 3, as will be described later in detail, has a magnetic member (i.e., a magnet for seating) 118. On the other hand, the revolving conveyor units 13A and 14A in the filling and cap fitting units 13 and 14, and the horizontal conveyor, article transfer, revolving conveyor, article transfer and horizontal conveyor units 17 to 22, as will be described later in detail, have positioning magnetic members for positioning bottle holders 3 in the filling and cap fitting units 13 and 14 and on the bottle conveying line 16 by exerting magnetic forces to the magnetic members of the bottle holders 3.

The cap holder 4, as will be described later in detail, has a magnetic member (i.e., a magnet for seating) 128. On the other hand, the revolving conveyor unit 14B in the cap fitting unit 14, and the horizontal conveyor unit 24, vertical conveyor unit 25, horizontal conveyor unit 26, article transfer unit 27, revolving conveyor unit 28, article transfer unit 29, horizontal conveyor unit 30, vertical conveyor unit 31 and horizontal conveyor unit 32 in the cap conveying line 23, have positioning magnetic members for positioning cap holders 4 conveyed in the cap fitting unit 14 and on the cap conveying line 23.

In the filling apparatus 10, the cap aligner/feeder 12 is disposed right above (i.e., on a floor above) the cap conveying line 23. The cap fitting unit 14 is disposed right underneath (i.e., on a floor underneath) the cap aligner/feeder 12, and cap holders 4 are conveyed vertically along the vertical conveyor units 25 and 31.

The filling apparatus 10 operates in the following steps (1) to (12).

(1) The bottle aligner/feeder 11 receives bottles 1 fed from a bottle feeder 41 and feeds twelve bottles 1 one at a time via twelve parallel bottle feed lanes 41 to twelve bottle holders 3, respectively. At this time, the twelve empty bottle holders 3 are waiting in a row beneath the twelve parallell bottle feed lanes and on the same line on a bottle reception conveyor 43.

(2) The bottle holders 3, to which bottles 1 have been supplied in the bottle aligner/feeder 11, are fed into the filling unit 13 via the horizontal conveyor and article transfer units 17 and 18 in the bottle conveying line 16. The horizontal conveyor unit 17 in the bottle conveying line 16 runs parallel to one side of the horizontal conveyor unit 22 in the line 16, then crosses the unit 22, and then runs beneath and parallel to the unit 22.

(3) While bottle holders 3 having been fed into the filling unit 13 are moving on the revolving conveyor unit 13A, contents are charged into the bottles 1. In FIG. 2, designated at A is a filling zone.

(4) After the contends have been charged, the bottles 1 are fed together with the holders 3 into the cap fitting unit 14 via the revolving conveyor unit 19.

(5) Meanwhile, concurrently with the steps (1) to (4), the cap aligner/feeder 12 receives caps 2 fed from a cap feeder 51 and feeds these caps to respective cap holders 4.

(6) The cap holders 4, to which the caps 2 have been fed in the cap aligner/feeder 12, are fed into the cap fitting unit 14 via the horizontal conveyor, vertical conveyor, horizontal conveyor, article transfer and revolving conveyor units 24 to 28 in the cap conveying line 23. The horizontal and vertical conveyor units 24 and 25 of the cap conveying line 23 run parallel to one side of the horizontal and vertical conveyor units 32 and 31, respectively, of the cap conveying line 23.

(7) When each cap holder 4 is fed into the cap fitting unit 14, the cap 2 is removed in the unit 14. Designated at A in FIG. 3 is a cap removal zone.

(8) Cap holders 4 after removal of the caps 2, are fed back to the cap aligner/feeder 12 via the article transfer, horizontal transfer, vertical transfer and horizontal conveyor units 29 to 33 in the cap conveying line 23 to be ready for the above step (5).

(9) While bottle holders 3 that have been fed into the cap fitting unit 14 in the step (4) are moving with a cap fitting station along the conveyor unit 14A of the cap fitting unit 14, caps 2 having been fed to the cap fitting unit 14 in the above step (7) and conveyed along the moving conveyor unit 14B are fitted on bottles 1. Designated at B in FIG. 2 is a cap fittig zone.

(10) The bottles 1 with the caps 2 fitted thereon, are fed together with their holders 3 into the packing unit 15 via the conveyor, article transfer and horizontal conveyor units 20 to 22 in the bottle conveying line 16.

(11) When the bottle holders 3 are fed into the packing unit 15, the bottles 1 are taken out of the bottle holders 3 and packed.

(12) The empty bottle holders 3 after the bottles 1 have been taken out from them, are fed back on the horizontal conveyor unit 22 to the bottle aligner/feeder 11 to be ready for the step (1) above.

Now, (A) bottle holder 3, (B) cap holder 4, (C) horizontal conveyor units 17, 22, 24, 26, 30 and 32, (D) vertical conveyor units 25 and 31, (E) revolving conveyors 13A, 14A, 14B, 19, 20 and 28, (F) article transfer units 18, 21, 27 and 29, and (G) cap aligner/feeder 12, will be described individually in detail.

Figure 4A:
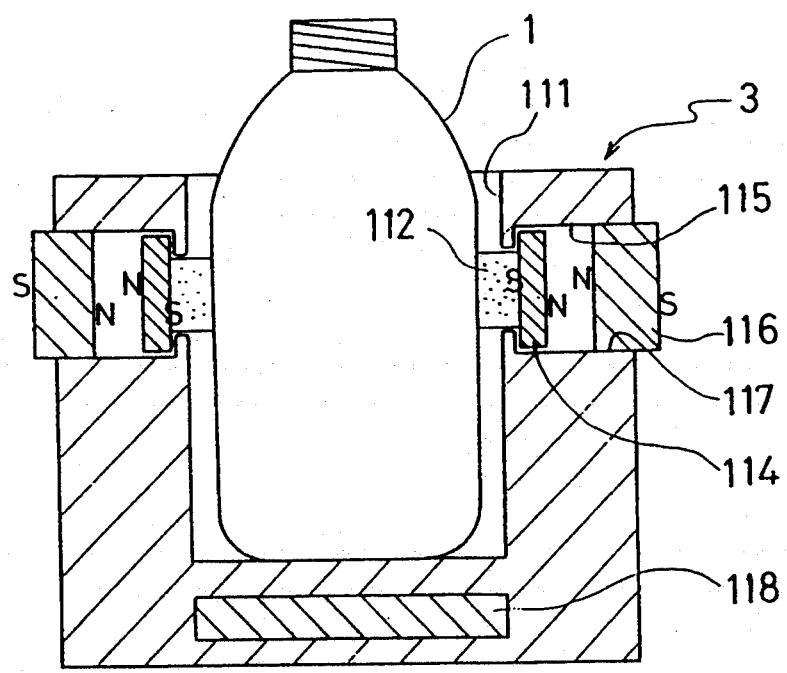
FIGS. 4A and 4B are schematic views showing a bottle holder.
Figure 4B:
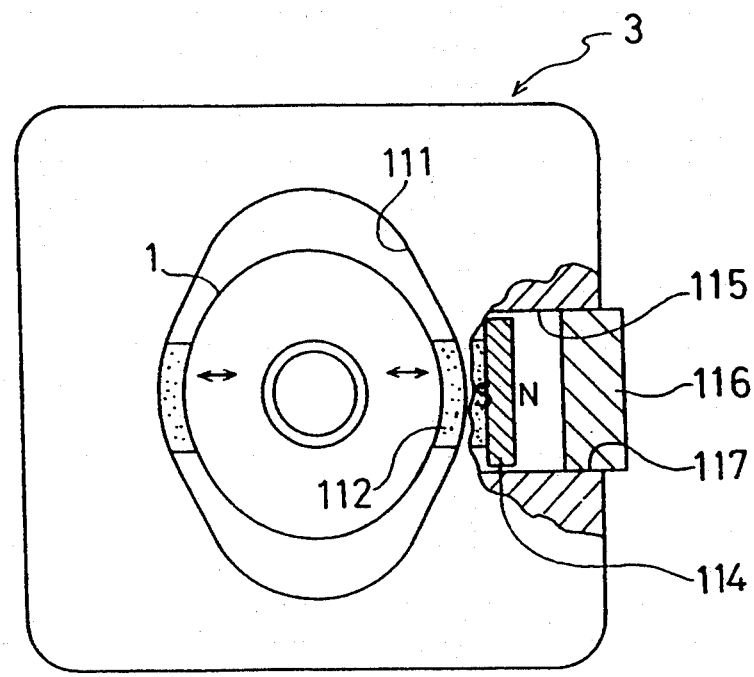

(A) Bottle holder 3 (FIGS. 4A and 4B)

Bottle holders 3 are conveyed in succession on the conveying line. Each of them can carry a bottle 1 loaded in its bottle holding space 111 such that it is clamped on its opposite sides by a pair of front and rear, bottle holding members 112.

Each bottle holding member 112 is made of rubber or like elastic material or Teflon (a trade name) or like low frictional coefficient material. A first magnet 114 is secured to the back side of each bottle holding member 112. The bottle holding members 112 and first magnets 114 are carried by the bottle holder 3 such that they can be moved along a bottle holding direction along guide holes 115 formed in the bottle holder 3.

Second magnets 116 are secured to the bottle holder 3 such that they each face each of the first magnets 114. These second magnets 116 are secured to the bottle holder 3 such that they are pressure fitted in mounting holes 117. Like poles (for instance N poles) of the associated two magnets 114 and 116 face each other.

The front and rear bottle holding members 111 are disposed on the front and rear sides of the bottle holding space 111 of the bottle holder 3.

Second magnets 116 have their poles (for instance S poles) other than those facing the first magnets 114, form outer surfaces of the bottle holder 3. Thus, as adjacent bottle holders 3 are fed in succession on the conveying line, the second magnets 116 of adjacent bottle holders 3 that face each other have their like poles (for instance S poles) face each other.

This example of the bottle holder has the following functions.

When a bottle 1 is loaded in the bottle holding space 111 of the bottle holder 3, the bottle holding members 112 are pushed in the bottle holder 3 by the force of loading the bottle 1 that surpasses magnetic forces of repulsion produced between the like poles (for instance N poles) in each set of the first and second magnets 114 and 116 that face each other. When the bottle 1 is loaded in the bottle holding space 111, the bottle holding members 112 push and reliably hold the bottle 1 with the magnetic forces of repulsion between the first and second magnets 114 and 116 in each set as noted above.

The urging forces, with which the bottle holding members 112 push and hold the bottle 1, are based on the magnetic forces of repulsion and are not deteriorated by wear. It is thus possible to reduce the frequency of maintenance.

It is possible to set a considerably large stroke of movement of the bottle holding members 112 against the magnetic forces of repulsion. Thus, changes in the size and shape of the bottle 1 can be absorbed within the range of the above movement stroke, and the bottle 1 loaded in the bottle holding space 111, is held reliably by adequate urging forces provided by the bottle holding members 112 irrespective of its size and shape. Satisfactory adaptability thus can be obtained with respect to variations of the size and shape of the bottle 1.

When the pair bottle holding members 112 faces each other on the opposite sides of the bottle holding space 111, they clamp the bottle 1 by being backed up by equal magnetic forces of repulsion. This permits the centering of the bottle 1 in the bottle holding space 111.

As bottle holders 3 are led in succession on the conveying line, adjacent bottle holders 3 are prevented from colliding with each other by magnetic forces of repulsion generated between the second magnets 116 provided in their surfaces facing each other. The impact force of collision of bottle holders 3 will be buffered.

The bottle holder 3 has a seating magnet 118 buried in its bottom portion, while the underside of conveyors or the like forming the conveying line is provided with a magnetic member extending in the conveying direction. When adjacent bottle holders 3 are going to collide with each other, magnetic forces of repulsion are generated between the second magnets 116 of the adjacent bottle holders 3 that face each other, the two bottle holders 3 are subject to undergo movement for escape since they float randomly forward and backward, or to the left or right. The seating magnet 118 on the side of each bottle holder 3 can suppress such movement for escape with magnetic forces of reaction generated between it and the conveying line side magnetic member.

Figure 5A:
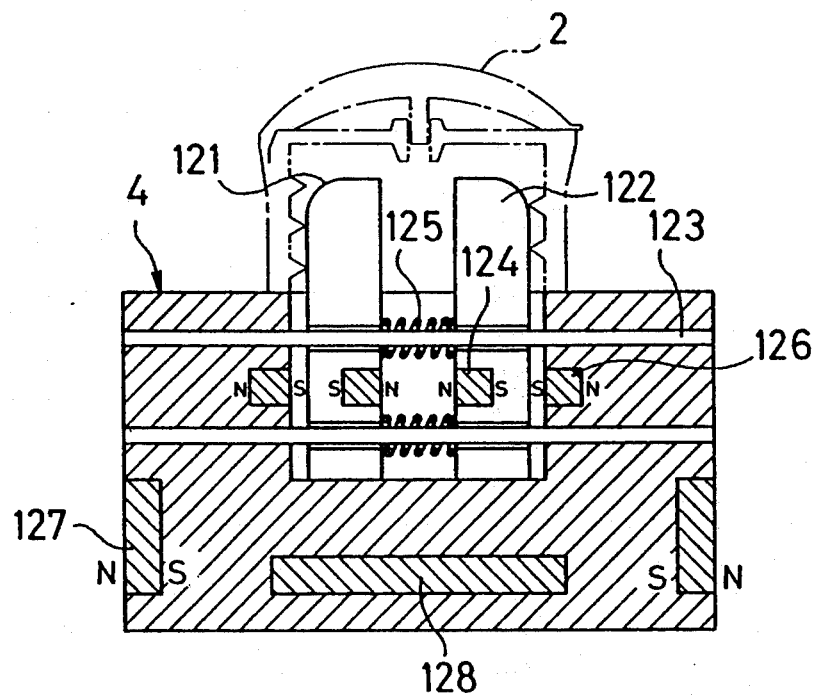
FIGS. 5A and 5B are schematic views showing a cap holder.
Figure 5B:
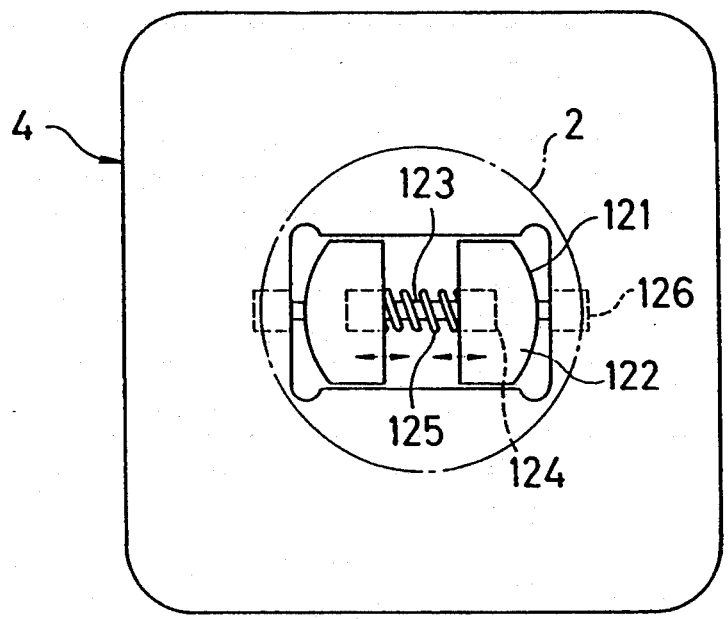

(B) Cap holder 4 (FIGS. 5A and 5B)

Cap holders 4 are conveyed in succession on the conveying line. A cap 2 that is carried in each cap holder 4 is held around a cap holding portion 121, and has its inner surfaces pushed and held by a pair of, i.e., front and rear, cap holding members 122.

The cap holding members 122 are each made of rubber or like elastic material or Teflon (a trade name) or like low friction coefficient material. They are supported in the cap holder 4 such that they are movable in a cap holding direction along two, i.e., upper and lower, guide rods 123 provided in the cap holder 4.

Further, the opposed inner surfaces of the two cap holding members 122 each have a first magnet 124 each of which have like poles (for instance N poles) which face each other. Between the two cap holding members 122, a compression spring 125 is fitted on each of the guide rods 123. The magnetic forces of reaction between the first magnets 124 facing each other and the spring forces of the compression springs 125 provide the two cap holding members 122 with a tendency of holding the cap 2 by applying pressures to the inner surfaces of the cap.

The cap holder 4 further has a pair of second magnets 126 buried at positions on the opposite sides of the cap holding members 122 and facing the first magnets 124 such that like poles of the second magnets 126 face like poles (for instance S poles) of the first magnets 124. Thus, the two cap holding members 122 are centered in the cap holder 4 by the magnetic forces of repulsion between the magnets 124 and 126 facing each other in each set (which are weaker than the magnetic forces of repulsion between the magnets 124 facing each other). The cap 2 that is held between the two cap holding members 122 is thus centered at the central position of the cap holder 4.

The cap holder 4 further has a pair of guide magnets 127 buried in its front and rear outer surfaces. Thus, when adjacent cap holders 4 are fed on the conveying line, like poles (for instance S poles) of the opposed guide magnets 127 of adjacent cap holders 4 face each other. The guide magnet 127 also serves, on the output side of the vertical conveyor unit 25 which will be described later in detail, as a guide for guiding the own cap holder 4 as the cap holder is transferred to the horizontal conveyor unit 26.

With this example of the cap holder, the following functions are obtainable.

When loading the cap 2 around the cap holding portion 121 of the cap holder 4, the two cap holding members 122 are brought closer to be closed by the force of insertion of the cap 2 that surpasses the magnetic forces of repulsion between the first magnets 124 and the spring forces of the compression springs 125. When the cap 2 is loaded around the cap holding portion 121, the two cap holding members 122 are brought away from each other to be opened by the magnetic forces of repulsion between the first magnets 124 and the spring forces of the compression springs 125, thus urging against and reliably holding the cap 2.

The urging forces of the cap holding members 122 to push and hold the cap 2, are based on the magnetic forces of repulsion and are not deteriorated by wear. It is thus possible to reduce the frequency of maintenance.

It is possible to set a considerably large stroke of movement of the cap holding members 122 against the magnetic forces of repulsion. Thus, it is possible to absorb changes in the size and shape of the cap 2 in the range of the above movement. Further, the cap 2 loaded around the cap holding portion 121 can be held adequately by the application of adequate pressure from the cap holding members 122. Satisfactory adaptability thus can be obtained with respect to changes in the size and shape of the cap 2.

When the pair cap holding members 122 faces each other on the opposite side of the cap holding portion 121, they are backed up by equal magnetic forces of repulsion to push the cap 2. Further, the two cap holding members 122 are centered in the cap holder 4 by the magnetic forces of repulsion between the first and second magnets 124 and 126 for centering. The cap 2 thus can be centered with respect to the cap holding portion 121 irrespective of its size and shape variations.

When cap holders 4 are moved in succession along the conveying line, adjacent cap holders 4 are prevented from colliding with each other directly by the magnetic forces of repulsion generated between the guide magnets 127 disposed at their opposed surfaces. It is thus possible to buffer the impact forces of the cap holders 4.

The cap holder 4 has a seating magnet 128 provided in its bottom portion, and a magnetic member extending in the conveying direction is provided on the underside of the conveyor or the like constituting the conveying line. In this example, when adjacent cap holders 4 are going to collide with each other, magnetic forces of repulsion are generated between the opposed guide magnets 127 of the adjacent cap holders 4. In this case, the two cap holders 4 tend to be moved for escape since they float randomly forward and backward or to the left and right. At this time, a magnetic force of repulsion that is generated between the seating magnet 128 in each cap holder 4 and the conveying line side magnetic member, suppresses the movement for escape and ensures stable movement of the cap holders 4.

(C) Horizontal conveyor units 17, 22, 24, 26, 30 and 32 (FIGS. 6A to 9B)

FIGS. 6A and 6B show a horizontal conveyor unit 210, which may be adopted as the horizontal conveyor units 17 and 22 in the bottle conveying line 16 and also the horizontal conveyor units 24, 26, 30 and 32 in the cap conveying line 23. It is assumed that the horizontal conveyor unit 210 conveys article holders 212, which are a typical example of the bottle and cap holders 3 and 4. The article holder 212 is assumed to have a seating magnet 215, which serves as the seating magnets 118 and 128 in the bottle and cap holders 3 and 4.

The conveyor unit 210 includes a conveyor belt 211, which is moved along a predetermined path for carrying article holders 212. Designated at 213 is a conveyor belt drive motor, and at 214 a non-magnetic belt support.

The article holder 212 having the seating magnet 215 also has flat guide surfaces 216 on its four sides and each subtending 90 degrees at its axis. The article holder 212 is held with its conveying position set with one of the guide surfaces 216 in frictional contact with an article position regulating member 217 to be described later in detail.

The article holder 212 may be a product container itself or a case or the like for conveying product container or the like.

The article position regulating member 217 of the conveyor unit 210 is bar- or plate-like in form and extends along and above the article movement path formed by the conveying belt 211. Designated at 218 are supports.

The conveyor unit 210 further includes article positioning magnets 219 which are disposed underneath the article movement path formed by the horizontal conveyor belt 211, which is passed around a magnet roller (or a roller made of iron or like magnetic material) 211A. The article positioning magnets 219 have a magnetic action with the seating magnet 215 so that one of the guide surfaces 216 of the article holder 212 is in forced contact with the article position regulating member 217.

The seating and article positioning magnets 215 and 219 are flat magnets. Their poles attracting each other can be made such that they face each other via the conveyor belt 211 and non-magnetic belt support 214. In the state of forced contact between the article holder 212 and the article position regulating member 217, the center of each article positioning magnet 219 is located nearer the article position regulating member 217 than the center of the seating magnet 215. Thus, the article positioning magnet 219 has an action of magnetic attraction on the seating magnet 215 such as to have the guide surface 216 of the article holder 212 in forced contact with the article position regulating member 217. Specifically, the S pole of the seating magnet 215 can face the article position regulating member 219, and the N pole of the article position regulating member 219 can face the seating magnet 215.

The seating and article positioning magnets 215 and 219 have repelling poles facing each other via the conveyor belt 211 and non-magnetic belt support 214. In the state of forced contact between the article holder 212 and the article position regulating member 217, the center of the article positioning magnet 219 is located at a greater distance from the article position regulating member 217 than the center of the seating magnet 215. In this case, the article positioning magnet 219 has an action of magnetic repulsion on the seating magnet 215 such as to have one of the guide surfaces 216 of the article holder 212 in forced contact with the article position regulating member 217.

The article position regulating magnet 219 may be any magnet so long as it has a magnetic action on the seating magnet 215 of the article holder 212 to have a guide surface 216 thereof in forced contact with the article position regulating member 217. Thus, the article position regulating member 219 need not be disposed on the side of the conveyor belt 211 and non-magnetic belt support 214 opposite the seating magnet 215. That is, it is also possible to dispose the article position regulating magnet 219 above the article movement path formed by the conveyor belt 211.

The magnets 215 and 219 may be permanent magnets, rubber magnets or electromagnets. Further, it is possible to use a mere magnetic member, such as an iron plate, as either magnet 215 or 219.

This example of the horizontal conveyor unit has the following functions.

The article holder 212 is conveyed on the conveyor belt 211 in a state that it is held in forced contact with the article position regulating member 217 by the magnetic action (i.e., magnetic action of attraction or repulsion) provided by the article positioning magnet 219. That is, while the article holder 212 is conveyed on the conveyor belt 211, it is positioned and held by the article position regulating member 217 and is not deviated from its predetermined horizontal conveying position.

The horizontal conveyor unit 210 may be replaced with a horizontal conveyor unit 210A as shown in FIGS. 7A and 7B. The horizontal conveyor unit 210A is obtained by removing the article position regulating member 217 from the horizontal conveyor unit 210. With this horizontal conveyor unit 210A, the article holder 212 is horizontally conveyed on the conveying belt 211 such that the seating magnet 215 is aligned to the article positioning magnets 219 by the action of magnetic attraction.

However, it is possible to obtain a more stable conveying position of the article holder 212 with the horizontal conveyor unit 210 than with the horizontal conveyor unit 210A. Thus, it is suitable to adopt the horizontal conveyor unit 210 for a connection zone between the horizontal conveyor unit 17 and article transfer unit 18, a connection zone between the horizontal convyor unit 22 and article transfer unit 21 and other zones, for which it is desired to provide high positioning accuracy of conveying article holders 212, as shown in FIG. 2.

Figure 8A:
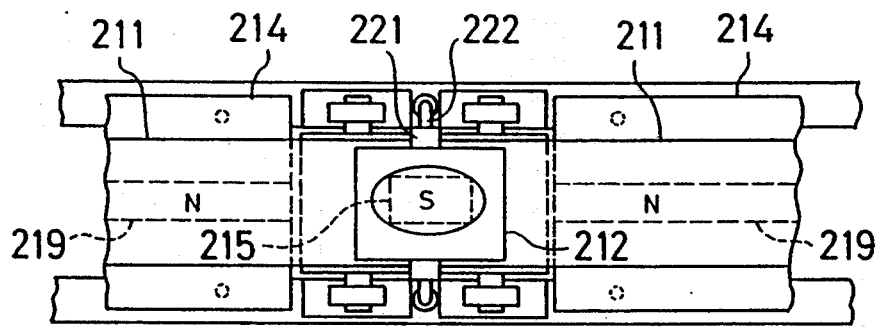
FIGS. 8A and 8B are schematic views showing an end-to-end arrangement of adjacent conveyors in the horizontal conveyor unit.
Figure 8B:
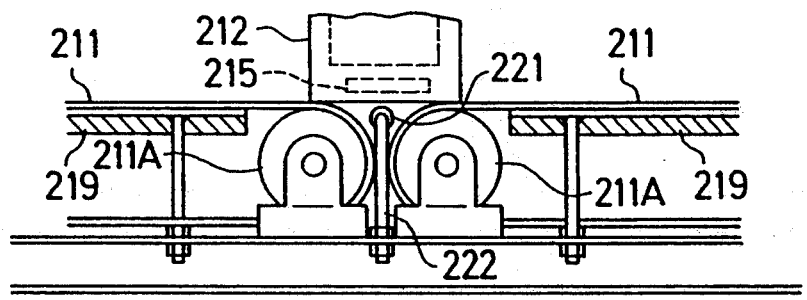

FIGS. 8A and 8B show an end-to-end arrangement of adjacent ones of a plurality of conveyor belts 211 extending serially in the conveying direction in the horizontal conveyor unit 210. Referring to the Figures, the opposed ends of the two belts 211 as shown are passed round respective magnet rollers (or rollers made of iron or like magnetic material) 211A. Between the two magnet rollers 211A is interposed a free roller 221, past which article holders 212 proceed from one to the other belts 211. The free roller 221 is supported rotatably by a support member 222 in the valley between the adjacent magnet rollers 211A. It is flush with the conveying surfaces of the two adjacent conveyor belts 211 so that it can stably support the article holder 212 proceeding from one to the other conveyor belt 211.

Figure 9A:
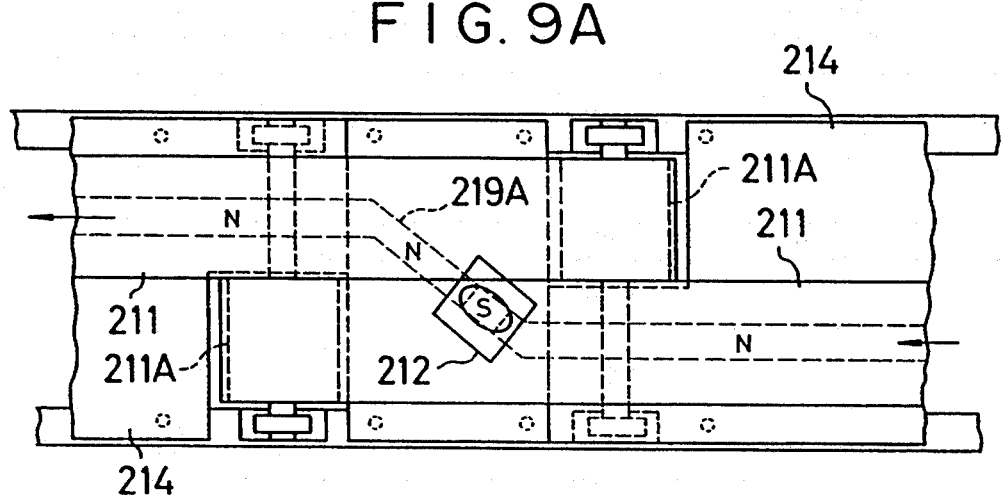
FIGS. 9A and 9B are schematic views showing a variation of the end-to-end arrangement of adjacent conveyors in the horizontal conveyor unit.
Figure 9B:
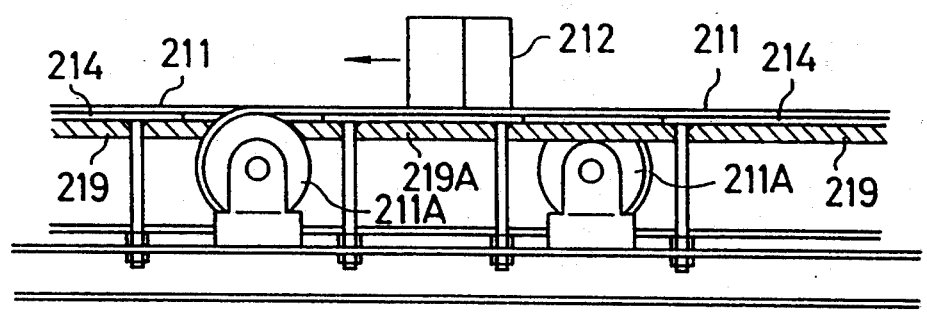

FIGS. 9A and 9B shows another example of the conveyor belt arrangement. In this example, the conveyor unit 210 comprises a plurality of conveyor belts 211 in a parallel arrangement. More specifically, an outlet end portion of the upstream belt 211 and an inlet end portion of the downstream belt 211, are disposed parallel and connected to each other in an orthogonal direction to the conveying direction. The associated outlet and inlet end portions of the two conveyor belts 211 are disposed side by side for a predetermined length. Underneath the side-by-side disposition zone of the two conveyor belts 211, an article positioning magnet 219A is disposed such that it is angularly disposed with respect to the conveying direction, with its one end connected to the article positioning magnet 219 of the upstream belt 211 and its other end connected to the article positioning magnet 219 of the downstream belt 211. Thus, as the article holder 212 is going to proceed from one conveyor belt 211 to the adjacent one, the direction of its conveying is changed to an oblique direction because its seating magnet 215 is aligned to the article positioning magnet 219A by the action of magnetic attraction. As a result, the article holder 212 can be reliably transferred from the upstream to the downstream belt 211.

(D) Vertical conveyor unit 25 and 31 (FIGS. 10A and 10B)

FIGS. 10A and 10B show a vertical conveyor unit 310, which may be adopted for the vertical conveyor units 25 and 31 in the cap conveying line 23. Here, the unit 310 will be described in connection with its application as the vertical conveyor unit 25.

The vertical conveyor unit 310 includes an article positioning magnet 312, which is disposed along and inside an article movement path formed by a vertical conveyor belt 311 passed round an upper and a lower magnet roller (or roller made of iron or like magnetic material) 311A and 311B such that it provides an action of magnetic attraction to the seating magnet 128 of each article holder 4.

The vertical conveyor unit 310 has its inlet and outlet sides connected to the horizontal conveyor units 210 as described before.

A free roller 313 is disposed in a transfer zone between the inlet side of the vertical conveyor unit 310 and the inlet side horizontal conveyor unit 210. The free roller 313 is supported rotatably by a support member (not shown) in the valley space between two magnet rollers 211A and 311A such that it is flush with the conveying surfaces of the two belts 211 and 311. Thus, it can reliably support the cap holder 4 proceeding from the horizontal conveyor belt 211 to the vertical conveyor belt 311.

On the outlet side of the vertical conveyor unit 310, a pair of, i.e., left and right, guide rollers 314 are disposed in a transfer zone with respect to the outlet side horizontal conveyor unit 210. The two guide rollers 314 are disposed side-wise of the vertical conveyor belt 311, above the horizontal conveyor belt 211 and on the opposite sides of the movement path of cap holders 4 defined by these belts. It is supported on a support shaft 316 which is driven for rotation by a motor 315. Each guide roller 314 has a guide magnet 317 having an opposite pole to that of the guide magnet 127 of the cap holder 4, which opposite pole faces the movement path of cap holders 4. The two guide rollers 314 are rotated by the motor 315 in a synchronous relation to the horizontal and vertical conveyor units 210 and 310 to provide an action of magnetic attraction to the opposite side guide magnets 127 of a cap holder 4 being transferred from the vertical conveyor belt 311 to the horizontal conveyor belt 211, thus re-directing the cap holder 4 by 90 degrees (which is an angle between the horizontal and vertical conveyor belts 211 and 311). Thus, the cap holder 4 can be transferred from the vertical conveyor belt 311 to the horizontal conveyor belt 211.

This example of the vertical conveyor unit has the following function.

The cap holder 4 can be vertically conveyed on the vertical conveyor belt 311 with its seating magnet 128 aligned to the article positioning magnet 312 by the action of magnetic attraction.

(E) Revolving conveyor unit 13A, 14A, 14B, 19, 20 and 28 (FIGS. 11 to 15B).

FIGS. 11 to 15B show a revolving conveyor unit 320, which may be adopted as the revolving conveyor units 1.3A and 14A of the filling and cap fitting units 13 and 14, revolving conveyor units 19 and 20 in the bottle conveying line and revolving conveyor unit 28 in the cap conveying line 23. It is assumed that the revolving conveyor unit 320 is for conveying article holders 212 as a typical representation of the bottle and cap holders 3 and 4. Further, the article holder 212 is assumed to have the seatig magnet 215 as a typical representation of the seating magnets 118 and 128 of the bottle and cap holders 3 and 4.

The revolving conveyor unit 320 includes a first and a second disk-like turntable 321 and 322 disposed adjacent to each other. In an article transfer zone, in which the two turntables 321 and 322 are close to each other, article holders 212 are transferred from the first turntable 321 to the second turntable 322.

The article holder 212 having the seating magnet 215 also has flat guide surfaces 216 on four sides each subtending an angle of 90 degrees at the axis.

The two turntables 321 and 322 have pluralities of article support sections 328 and 329 formed in their gear-like outer edges at a predetermined interval such as to mesh with one another in the article transfer zone. The two turntables 321 and 322 are driven synchronously such that the article support sections 328 and 329 approach one another successively in the article transfer zone.

Figure 11:
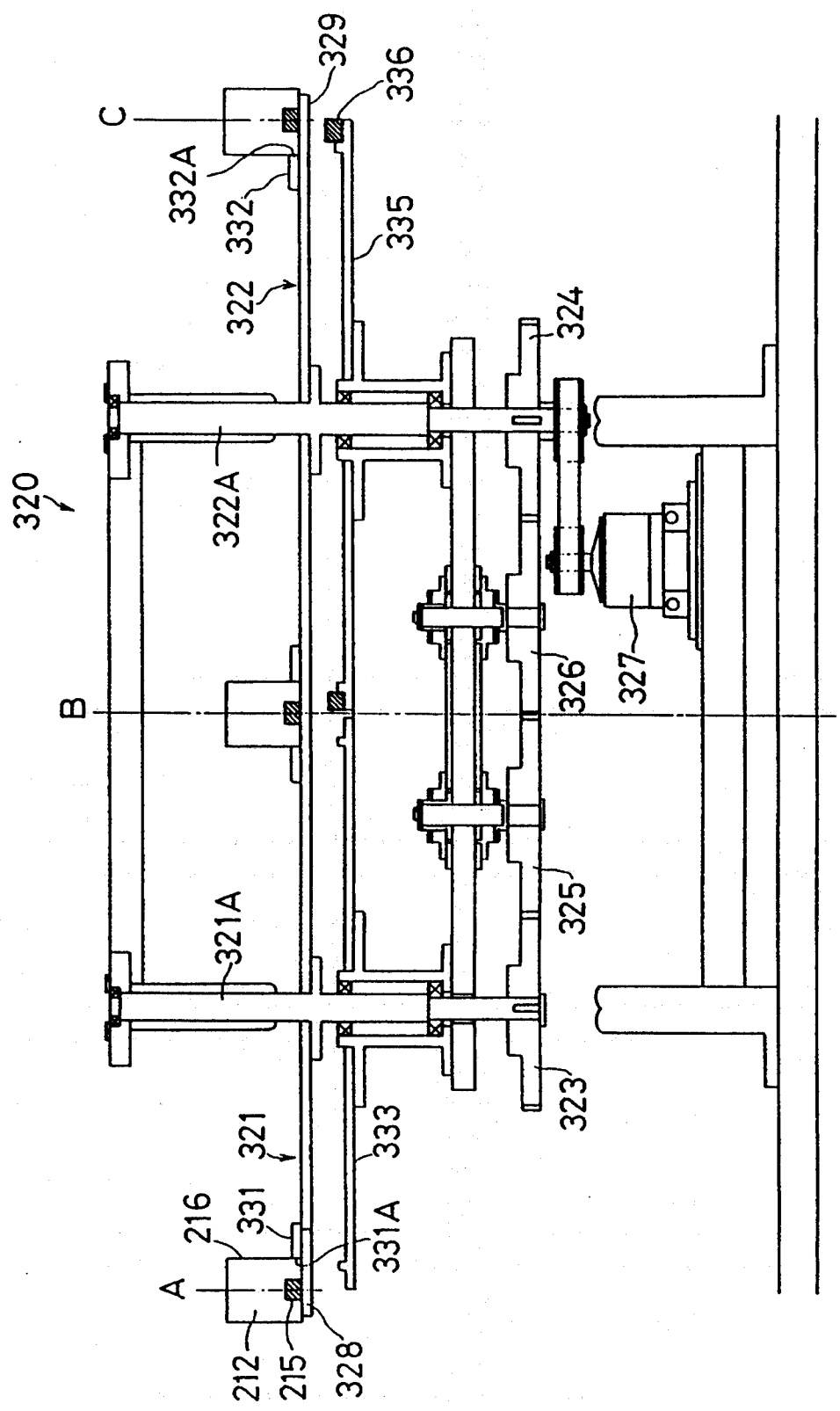
FIG. 11 is a schematic view showing a revolving conveyor unit.
Figure 12:
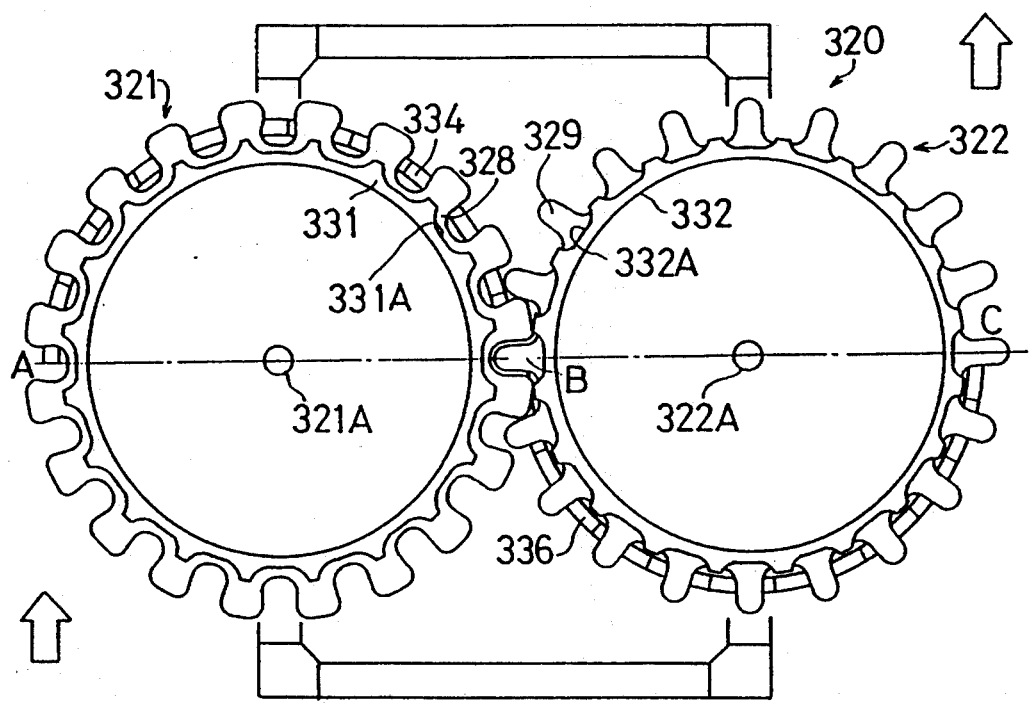
FIG. 12 is a plan view showing the revolving conveyor unit shown in FIG. 11.
Figure 13:
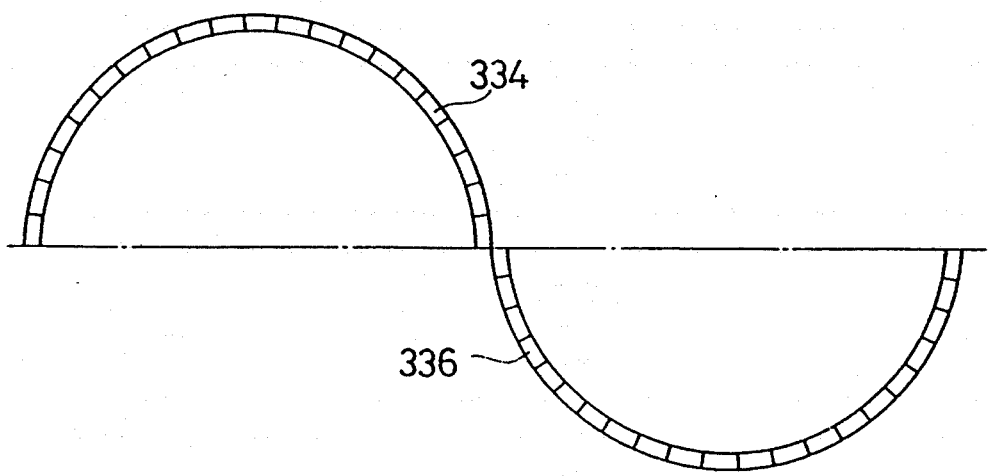
FIG. 13 is a schematic view showing the arrangement of positioning magnets in the revolving conveyor unit shown in FIG. 11.

FIG. 11 shows a syncronous drive mechanism for the two turntables 321 and 322. As shown, a gear 323 provided on a shaft 321A of the first turntable 321 and a gear 324 provided on a shaft 322A of the second turntable 322 are coupled to each other via intermediate gears 325 and 326. One of the shafts 321A and 322A (in this example the shaft 322A) is driven by a drive motor 327.

The two turntables 321 and 322 have respective ting-like article position regulating members 331 and 332 secured to them on the inner side of the article support sections 328 and 329. The turntables 321 and 322 thus regulate and hold the article position on them such that guide surfaces 216 of each article holder 212 supported in article support sections 328 and 329 are in contact with substantially U-shaped regulating surfaces 331A and 332A of the article position regulating members 331 and 332. In the article transfer zone of the two turntables 321 and 322, each article holder 212 rests on two article support sections 328 and 329 simultaneously and is sandwiched between U-shaped regulating surfaces 331A and 332A of the article position regulating members 331 and 332.

Further, the revolving conveyor unit 320 includes a first stationary table 333 which is disposed underneath the first turntable 321. The first stationary table 333 has article positioning/attracting magnets 334 for attracting article holders 212, these magnets being provided in a row along a half circumference of the first stationary table 333 along the article movement path formed by the first turntable 321 (from feed-in section A to transfer section B). The magnets 334 provide an action of magnetic attraction to the seating magnet 215 of the article holder 212 to bring a guide surface 216 thereof into forced contact with a U-shaped regulating surfaces 331A of the article position regulating member 331.

The revolving conveyor unit 320 also includes a second stationary table 335 which is disposed underneath the second turntable 322. The second stationary table 335 has article positioning/attracting magnets 336 for attracting article holders 212, these magnets being provided in a row along a half circumference of the second stationary table 335 along the article movement path formed by the second turntable 322 (from transfer section B to feed-out section C). The magnets 336 provide an action of magnetic attraction to the seating magnet 215 of the article holder 212 to bring a guide surface 216 thereof into forced contact with a U-saped regulating surface 332A of the article position regulating member 332.

The article positioning/attracting magnets 334 and 336 are arranged such that they can simultaneously attract the same article holder 212 in the article transfer zone of the two turntables 321 and 322.

The seating magnet 215 and article positioning/attracting magnets 334 and 336 are disk-like magnets. Their poles which attract one another can face one another vertically. In the state with the article holder 212 held in forced contact with the article position regulating members 331 and 332, the center of the article positioning/attracting magnets 334 and 336 is found to be closer to the article position regulating members 331 and 332 than the center of the seating magnet 215. Thus, the article positioning/attracting magnets 334 and 336 provide an action of magnetic attraction to the seating magnet 215 of the article holder 212 to bring a guide surface 216 thereof into forced contact with the article position regulating members 331 and 332. In other words, the S pole of the seating magnet 215 can face the article positioning/attracting magnets 334 and 336, and the N pole of the article positioning/attracting magnets 334 and 336 can face the seating magnet 21.

As an alternative arrangement, it is possible to have the mutually repelling poles of the seating magnet 215 and article positioning/attracting magnets 334 and 336 face one another vertically so that in the state where the article holder 212 is forced into contact with the article position regulating members 331 and 332, the center of the article positioning/attracting magnets 334 and 336 will be closer to the article position regulating members 331 and 332 than the center of the seating magnet 215. In this case, the article positioning/attracting magnets 334 and 336 provide an action of magnetic repulsion to the seating magnet 215 of the article holder 212 to bring a guide surface 216 thereof into forced contact with the article position regulating members 331 and 332.

Generally any arrangement is possible so long as the article positioning/attracting magnets 334 and 336 provide a magnetic action to the seating magnet 215 of the article holder 212 to bring a guide surface 216 thereof into forced contact with the article position regulating members 331 and 332. Thus, the article positioning/attracting magnets 334 and 336 need not be disposed such that they face the seating magnet 215 vertically. The article positioning/attracting magnets 334 and 336 may be disposed at side-wise positions along the article movement paths formed by the individual turntables 321 and 322.

The magnets 215, 332 and 336 may be permanent magnets, rubber magnets, electromagnets, etc. Further, either of the magnets 215 and 334 and either of the magnets 215 and 336 may be a mere magnetic member, such as an iron plate. Suitably, the magnetic force of the article positioning/attracting magnet 336 is set to be equal to or higher than the magnetic force of the positioning/attracting magnet 334.

Figure 14:
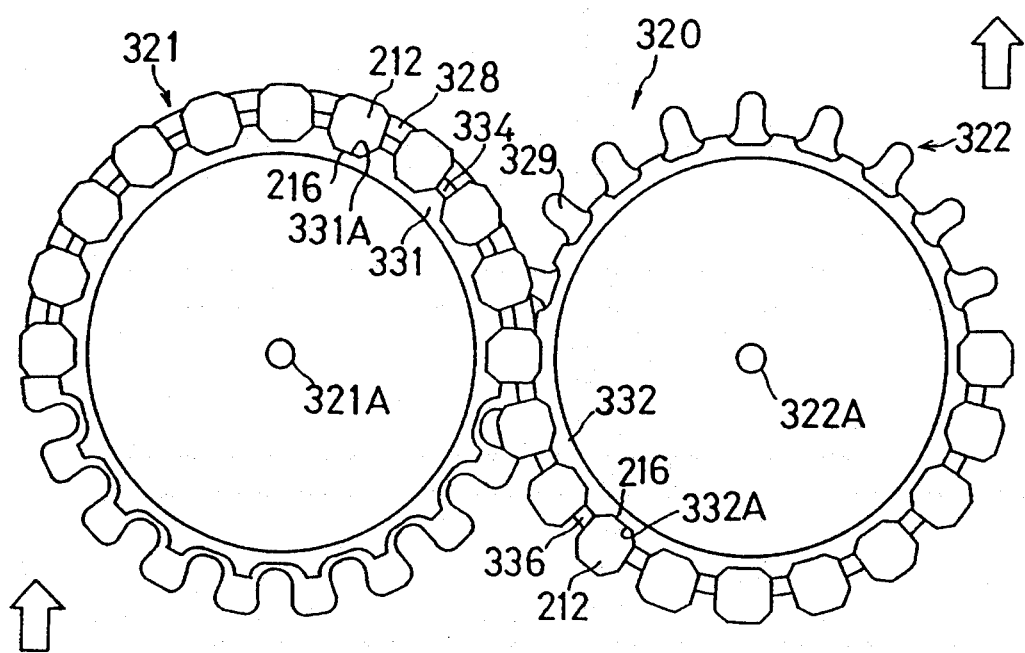
FIG. 14 is a view showing a state of conveying articles.
Figure 15A:
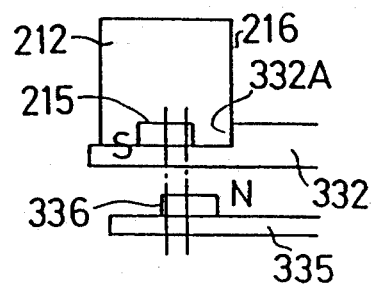
FIGS. 15A and 15B are schematic views showing a state of positioning an article.
Figure 15B:
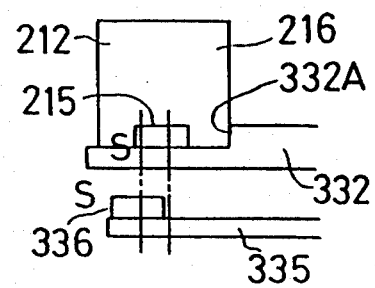
Figure 16A:
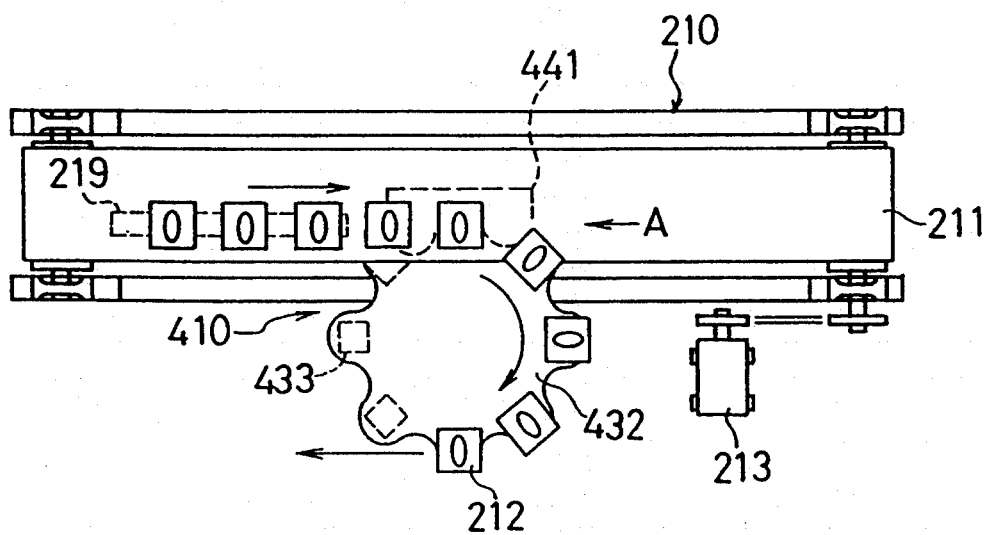
FIGS. 16A and 16B are schematic views showing an article transfer unit.
Figure 16B:
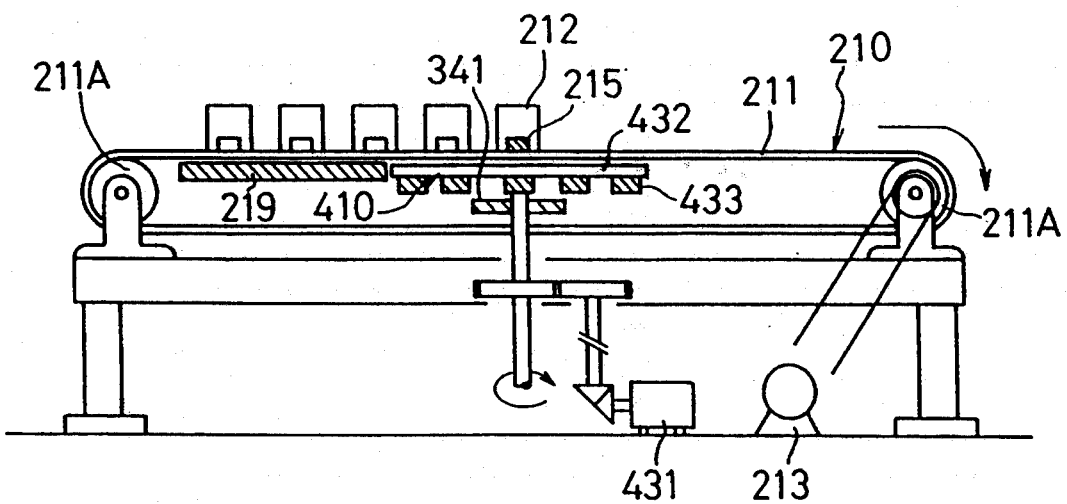
Figure 17:
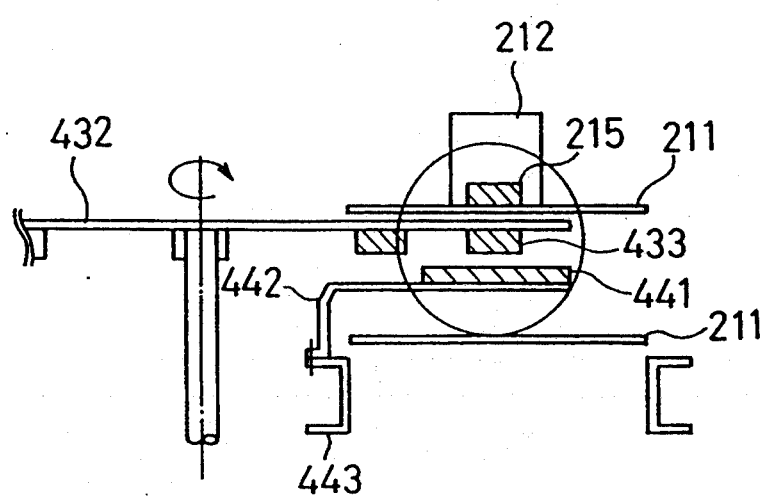
FIG. 17 is a schematic view showing the article transfer unit shown in FIG. 16A taken in the direction of arrow A.
Figure 18A:
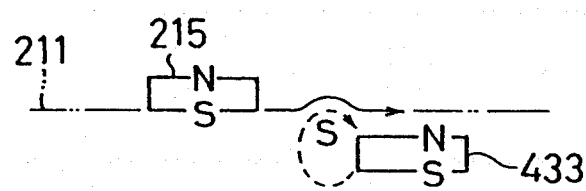
FIGS. 18A and 18B are schematic views showing a repelling magnetic field set up by an article drive magnet and a de-magnetizing action of a de-magnetizing magnet.
Figure 18B:
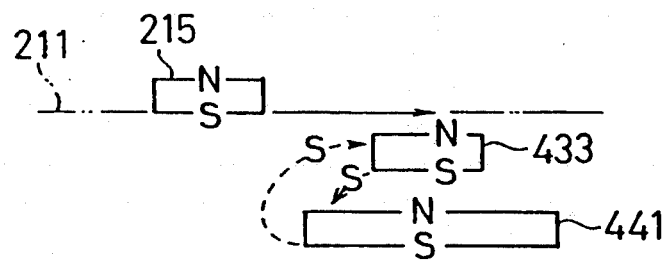

This example of the revolving conveyor unit has the following functions (see FIGS. 14 and 15).

In the article transfer zone, in which the two turntables 321 and 322 are close to each other, the article holder 212 having been conveyed on the first turntable 321, while being attracted by the positioning/attracting magnet 334 thereof, is also attracted by the positioning/attracting magnet 336 of the second turntable 322, and is transferred to the second turntable 322 while being attracted to the article positioning/attracting magnet 336. In other words, during the operation of its transfer from the first turntable 321 to the second turntable 322, the article holder 212 is not in a free state of being attracted by neither of the magnets 334 and 336 but is restrained by attraction of either of the magnets 334 and 336 before completion of the transfer. Thus, the article holder 212 can be transferred from the first turntable 321 to the second turntable 322 smoothly and without possibility of deviation of the conveying position.

The article holder 212 is conveyed on the turntables 321 and 322 in forced contact with at least either of the article position regulating members 331 and 332 by the magnetic action (i.e., action of magnetic attraction or repulsion) provided by at least either of the article positioning/attracting magnets 334 and 336. In other words, as the article holder 212 is conveyed on the turntables 321 and 322, it is positioned and fixedly held by the article position regulating members 331 and 332.

(F) Article transfer units 18, 21, 27 and 29 (FIGS. 16 to 19)

FIGS. 16 to 19 show an article transfer unit 410, which may be adopted as the article transfer units 18 and 21 in the bottle conveying line 16 and the article transfer units 27 and 29 in the cap conveying line 23. The article transfer unit 410 is assumed to convey article holders 212 as typical representation of the bottle and cap holders 3 and 4. It is also assumed that the article holder 212 has a seating magnet 215 as a typical representation of the seating magnets 118 and 128 of the bottle and cap holders 3 and 4.

The article transfer unit 410 transfers article holders 212 from the horizontal conveyor unit 210 described before or conversely.

As noted above, the cap holder 212 has the seating magnet 215, which is a disk-like permanent magnet.

The horizontal conveyor unit 210 has the conveyor belt 211, which is driven by the motor 213 as noted above, and on which article holders 212 can be conveyed.

The article transfer unit 410 includes a turntable 432 driven by a motor 431 and also has article drive magnets 433, which are disk-like permanent magnets disposed along the circumference of the lower surface of the turntable 432 and at a plurality of positions at a predetermined interval. The article drive magnets 433 provide an action of magnetic attraction to the seating magnet 215.

The article transfer unit 410 also includes a turntable 432 which is disposed underneath the conveyor belt 211 of the horizontal conveyor unit 210. The turntable 432 partly overlaps the conveyor belt 211. In the lap zone, a cap holder 212 on the conveyor belt 211 is attracted and transferred to the turntable 432 by the action of magnetic attraction provided by the action of the article drive magnet 433 noted above provided on the turntable 432. After the article holder 212 has been transferred to the turntable 432 of the article transfer unit 410, it is conveyed in a state held on the turntable 432 by the action of magnetic attraction between its seating magnet 215 and the article drive magnet 433.

The article transfer unit 410 further includes a demagnetizing magnet 441 comprising a disk-like permanent magnet, which is located in the lap zone between the conveyor belt 211 of the horizotnal conveyor unit 210 and the turntable 432 and beneath the article drive magnets 433 of the turntable 432 (i.e., on the side of the magnets 433 opposite the turntable 432). The de-magnetizing magnet 441 provides an action of magnetic attraction to the article drive magnets 433. The de-magnetizing magnet 441 is supported on a frame 443 of the horizontal conveyor unit 211 via a support bracket 442 (see FIG. 17).

The pole area of the de-magnetizing magnet 441 is set to be greater than the pole area of the article drive magnets 433.

Figure 19A:
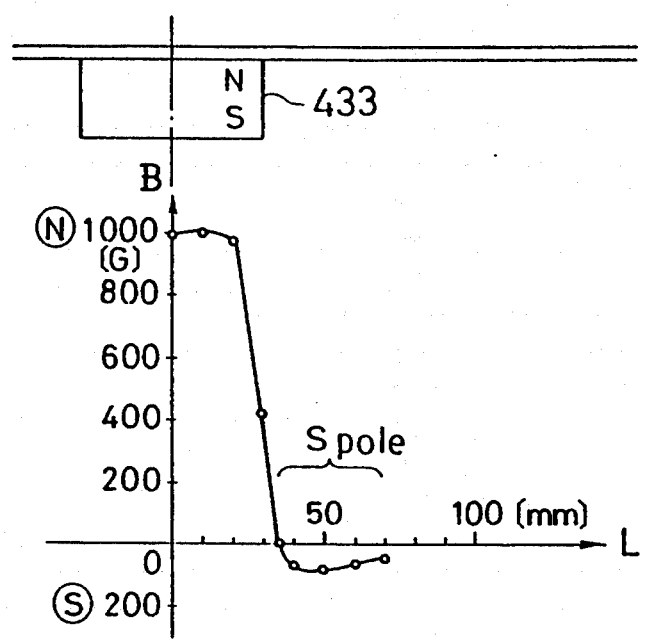
FIGS. 19A and 19B are graphs showing magnetic flux density at the level of an article conveying surface.
Figure 19B:
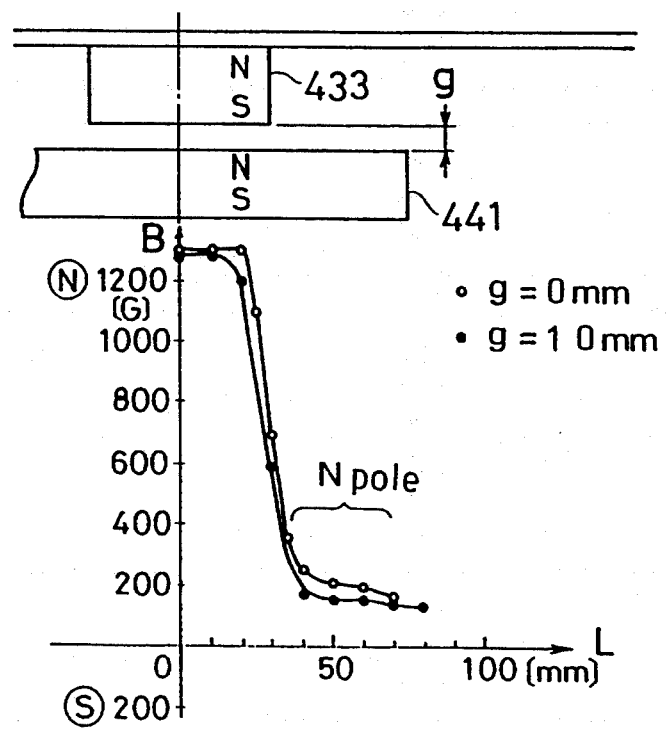
Figure 20A:
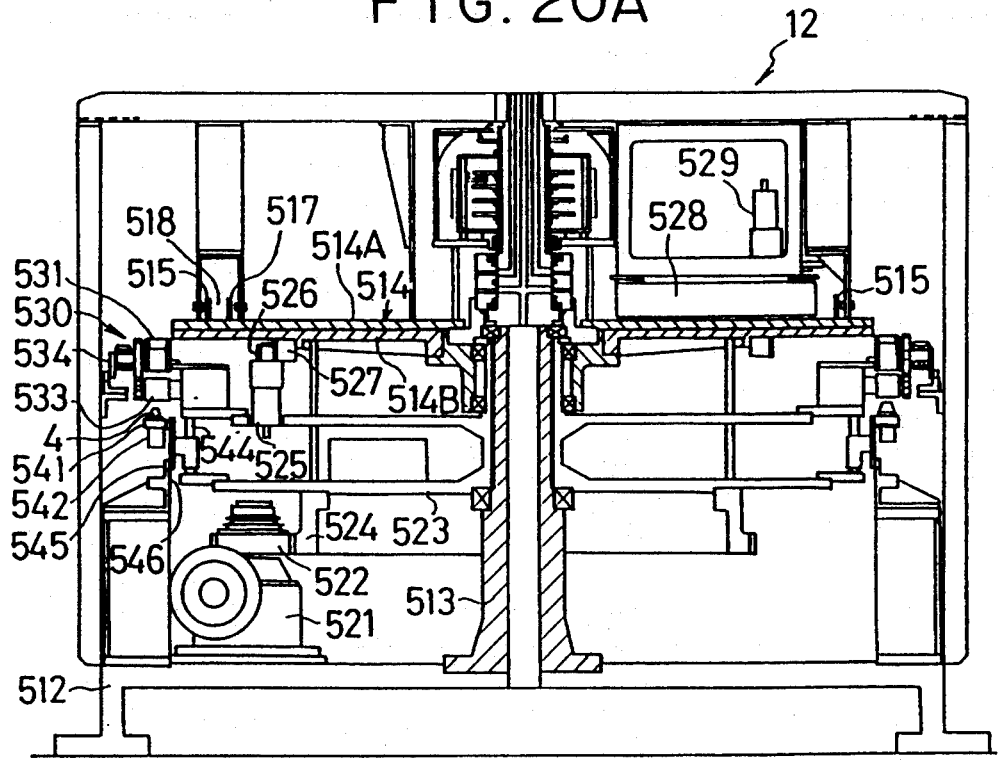
FIGS. 20A and 20B are schematic views a cap aligner/feeder.
Figure 20B:
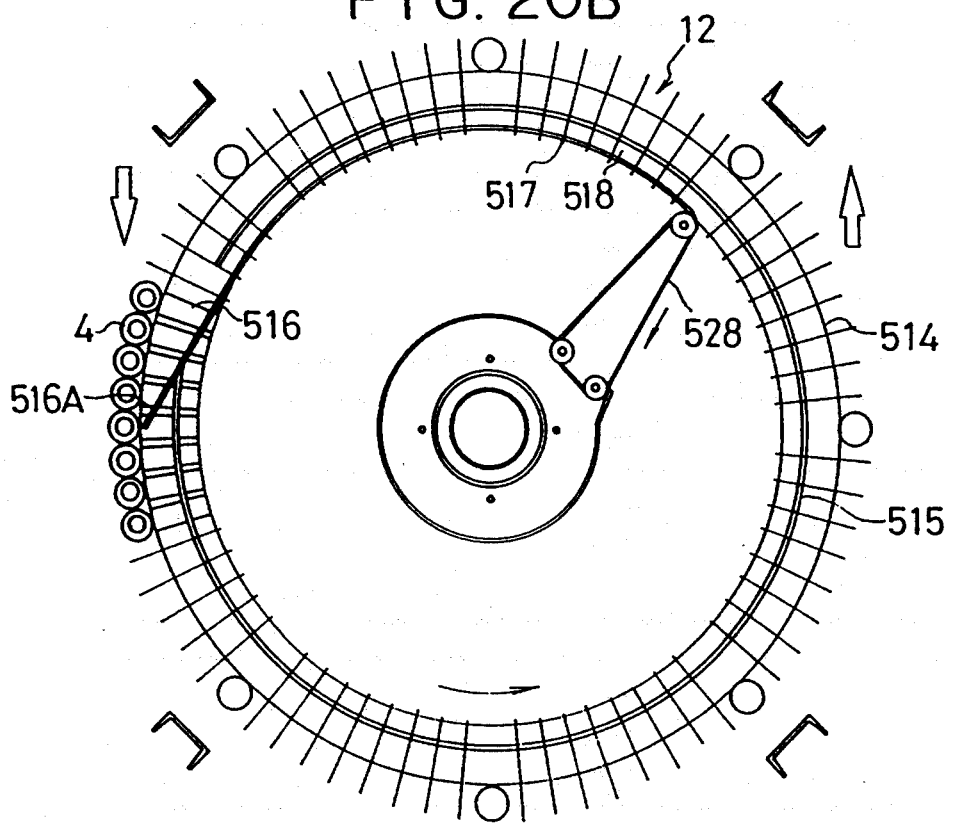
Figure 21A:
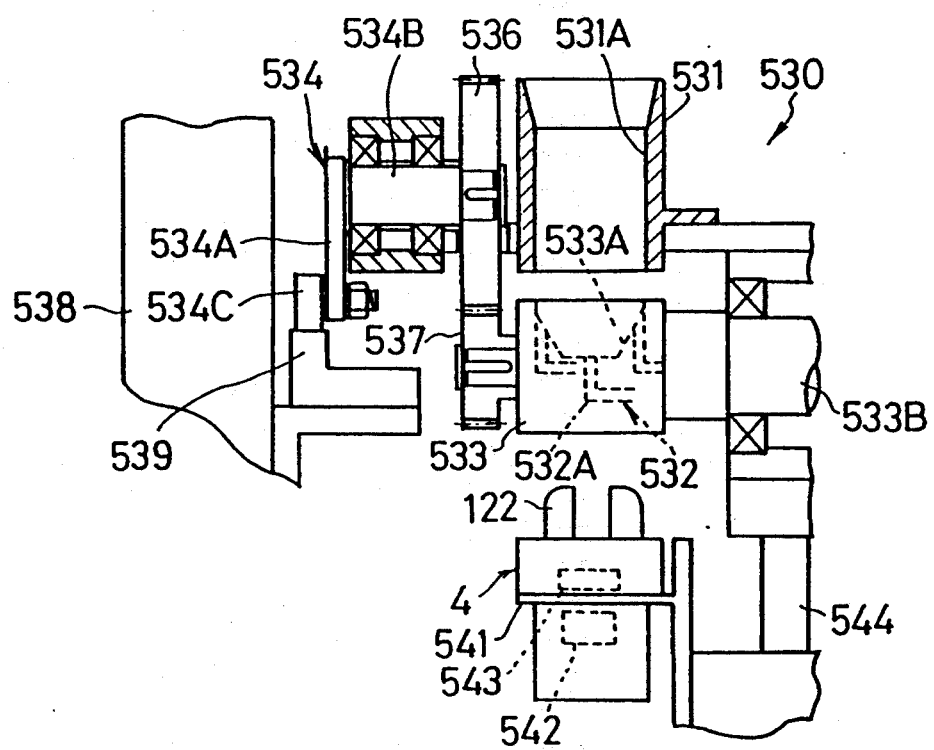
FIGS. 21A and 21B are schematic views showing a cap position controller.
Figure 21B:
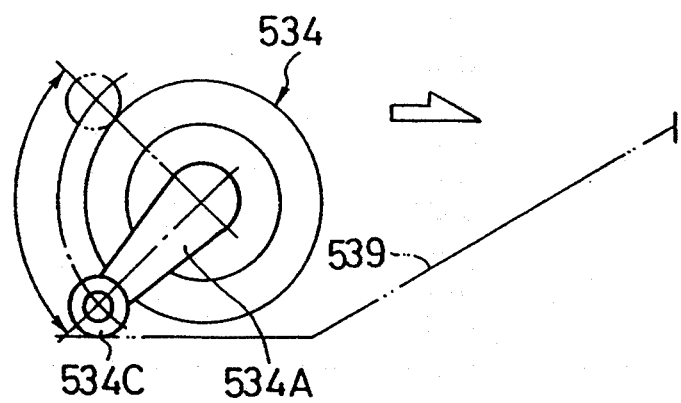
Figure 23A:
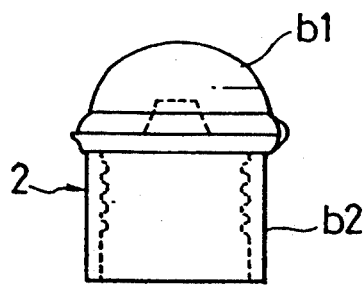
FIGS. 23A and 23B are schematic views showing a cap.
Figure 23B:
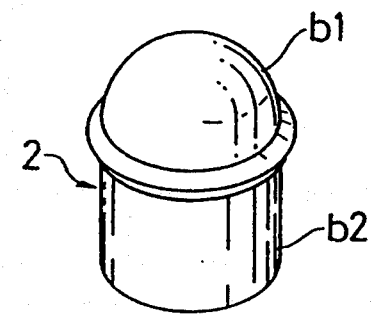
Figure 24A:
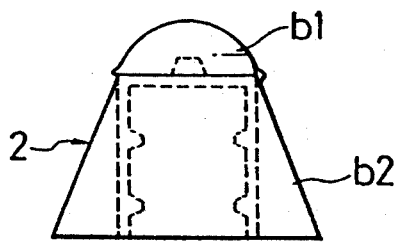
FIGS. 24A and 24B are schematic views showing a different cap.
Figure 24B:
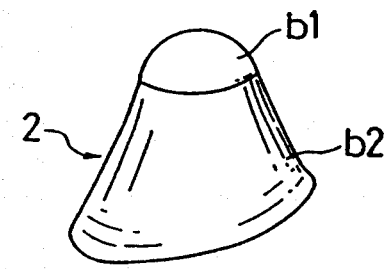
Figure 25A:
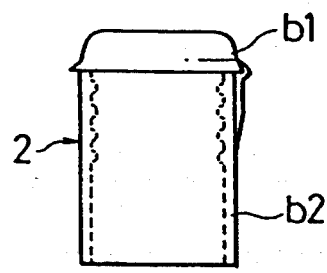
FIGS. 25A and 25B are schematic views showing a further cap.
Figure 25B:
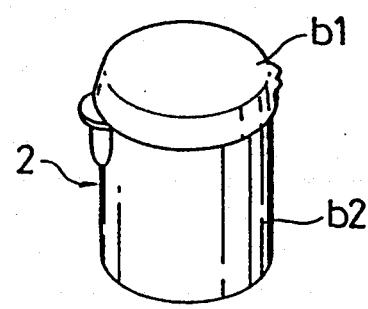

Now, a repelling magnetic field generated around each article drive magnet 433 and having an effect on the article conveying surface level and a de-magnetizing action for de-magnetizing the repelling magnetic field will be described. FIGS. 19A and 19B show the measured magnetic flux density B at the article conveying surface level of the conveyor belt 211, which is plotted against the distance L from the center of the article drive magnet 433. The plots in FIG. 19B are obtained by changing the gap g between the article drive and de-magnetizing magnets 433 and 441 from 0 to 10 min. In FIGS. 19A and 19B, the positive magnetic flux density B is N pole flux density, and the negative magnetic flux density B is S pole flux density.

(a) Without the de-magnetizing magnet 441 provided (see FIG. 18A):

Assuming the pole facing the conveyor belt 211 of the article drive magnet 433 to be N pole, a repelling magnetic field is produced by the S pole in the neighborhood of the conveyor belt 211 of the article drive magnet 433. This repelling magnetic field set up by the S pole has an effect extending up to the article conveying surface level of the conveyor belt 211 (see FIG. 19A). In this case, therefore, the repelling magnetic field of the S pole noted above of the article drive magnet 433 provides magnetic forces of repulsion to cause the seating magnet 215 of the article holder 212 to be floated from the conveying surface level or deviated in position. The article holder is therefore conveyed in an unstable manner.

(b) With the de-magnetizing magnet 441 provided (see FIG. 18B):

With the de-magnetizing magnet 441 provided to the above arrangement (a), the de-magnetizing magnet 441 has an action of magnetic attraction to the article drive magnet 433. As a result, the repelling magnetic field that is generated in the neighborhood of the conveyor belt 211 of the article drive magnet 433 is reduced and de-magnetized to have no effect on the article conveying surface level of the conveyor belt 211. Thus, there is the sole N pole attracting magnetic field at the article conveying surface level (see FIG. 19B). Thus, in this case, the S pole repelling magnetic field of the article drive magnet 433 does not provide any magnetic repelling force to the seating magnet 215 of the article holder 212. The article holder 212 thus is neither floated from the conveying surface level nor deviated in position, so that it can be conveyed in a stable manner.

As is seen from FIG. 19B, the de-magnetizing action of the de-magnetizing magnet 441 in the above arrangement (b) is the greater the smaller the gap g between the article drive de-magnetizing magnets 433 and 441.

In this example, the article side magnet, article drive magnets and de-magnetizing magnet may be electro-magnets.

(G) Cap aligner/feeder 12 (FIGS. 20 to 25B)

The cap aligner/feeder 12 transfers caps 2 one by one and in a predetermined position thereof to each cap holder 4 and feeds each cap 2 transferred to each cap holder 4 to the cap fitting unit 14 in the next step.

The cap aligner/feeder 12 includes a frame 512 supporting a center pole 513 which in turn supports a turntable 514. The turntable 514 has an outer guide 515 on its top surface substantially along its entire circumference. The top surface of the turntable 514 is provided with a plurality of circumferencially spaced-apart cap reception grooves 516 radially crossing the outer guide 515. The top surface is further provided with an inner guide 517 on the inner side of the outer guide 515, thus forming a cap discharge path 518 between the outer and inner guides 515 and 517. The cap reception grooves 516 are formed between adjacent ridges of table constituent members 514A and 514B of the turntable 514. Thus, in the cap aligner/feeder 12, a number of caps 2 which are stored within the outer guide 515, are received one by one in the cap reception grooves, and with the revolution of the turntable 514, the caps 2 received in the cap reception grooves 516 are discharged in a free position through the cap discharge path 518 to a cap position controller 530, which will be described later in detail.

In the cap aligner/feeder 12, a gear 522 secured to the output shaft of a motor 521 installed on the frame 512 and a gear 524 secured to an intermediate table 523 are meshed with each other, and also a gear 526 secured to the output shaft of a motor 525 installed on the intermediate table 523 and a gear 527 secured to the turntable 51.4 are meshed with each other.

Thus, in the cap aligner/feeder 12, by driving the motor 521 while holding the motor 525 stationary, the turntable 514 and intermediate table 523 can be turned in unison with each other. Further, with the driving of the motor 525, the lower table constituent member 514B constituting the turntable 514 is rotated slightly relative to the upper table constituent member 514A. This permits variation of the width of the cap reception grooves 516, which are formed by adjacent ridges of the two table constituent members 514A and 514B, to meet the size of the cap 2.

The cap aligner/feeder 12 further includes a cap jamming prevention belt 528, which is provided on a portion of the top surface of the turntable 514 corresponding to the inlet side of the cap discharge path 518. The cap jamming prevention belt 528 is driven by a motor 529 to bring caps 2, which have not been received in any cap reception groove 516 on the inlet side of the cap discharge path 518, back toward the center of the turntable 514, thus preventing the jamming of caps 2 on the inlet side of the cap discharge path 518.

The cap aligner/feeder 12 further has a discharge guide 516A, which is provided at a cap discharge zone set on the outlet side of the cap discharge path 518 and extends straight up to the outer edge of the turntable 514 across cap reception grooves 516. With the rotation of the turntable 514, the caps 2 having reached at the outlet side of the cap discharge path 518, are pushed by the discharge guide 516A radially outward through the corresponding cap reception grooves 516 to be thrown into a path forming member 531 in the cap position controller 530. The cap reception grooves 516 are horizontal or have a downward slope in the radially outward direction of the turntable 514.

Now, the cap position controller 530 will be described.

Cap position controllers 530 are provided circumferentially of the intermediate table 523 such that they are in one-to-one corresponding relation to the cap reception grooves 516 in the turntable 514. Each cap position controller 530 comprises a path forming member 531, a rising stream former 532, a cap holding member 533, a inverter 534 and a cap holder 4.

The path forming member 531 is cylindrical in shape and secured to the intermediate table 523. It has a vertical path 531A, through which caps 2 can pass freely.

The rising stream former 532 is formed by connecting a compressed air ductline to a flow path 532A provided in the cap holding member 533 such that a rising stream of compressed air is formed in the vertical path 531A of the path forming member 531. When a rising stream of compressed air is formed in the vertical path 531A of the rising stream former 532, it produces a negative pressure around the lower end opening of the path forming member 531. This negative pressure causes ambient air to be withdrawn into the path forming member 531 through the lower end opening thereof. This has an effect of making the rising stream in the vertical path 531A to be a laminar stream in the entire zone of the vertical path 531A. In consequence, an action of aligning the position of caps 2 to be described later in detail is made more reliable.

The cap molding member 533 is supported on the intermediate table 523 such that it is found underneath the path forming member 531, and it has a recessed holding surface 533A, in which the flow path 532A noted above is open. A shaft 533B of the cap holding member 533 is rotatably supported on the intermediate table 523 such that it can be inverted by the inverter 534. The cap holding member 533 can support a cap 2, which has been aligned substantially in a predetermined direction by the rising stream noted above in the vertical path 531A of the path former 531, by vacuum suction and release the vacuum suction.

The cap holding member 533 is adapted to selectably connect the compressed air and evacuating ductlines to the flow path 532A with an electromagnetic switching valve or the like.

The inverter 534 has a gear 536, which is secured to a shaft 534A of a inverting arm 534 rotatably supported on the intermediate table 523, and a gear 537, which is secured to a shaft 533B of the cap holding member 533, the gears 536 and 537 being in mesh with each other. The inverting arm 534A has a cam follower 534C, which is coupled to and driven by a inverting cam 539, which is supported on a circumferential post 538 provided on the frame 512 and is found along the excursion line of the intermediate table 523. While the intermediate table 523 completes one rotation, the cap molding member 533 is inverted 180 degrees from its regular upright state and then returned to the same state. The gear ratio between the gears 536 and 537 is 2:1, and thus the cap molding member 533 can be rotated by 180 degrees for every 90-degree rotation of the inverting arm 534A.

The cap holder 4 has cap holding members 122, and it receives a cap 2, from which the vacuum suction has been released by the cap holding member 533 inverted by the inverter 534, the cap 2 being at this time in a predetermined position which is obtained by inversion of the aligned state noted above.

The cap holder 4 is transferred from the feed-in unit to a transfer tool holder 541 of the cap position controller 530 to be held therein, and then it is transferred from the transfer tool holder 541 to the feed-out unit to be fed out to the cap fitting unit in the next step. The transfer tool holder 541 has a transfer tool positioning magnet unit 542, which provides an action of mutual attraction with a magnet 543 provided in the cap holder 4, thus permitting the positioning of the cap holder 4 to be coaxial with and right beneath the cap holding member 533.

The transfer tool holder 541 of the cap position controller 530 is supported by a hollow guide 544 secured to the intermediate table 523 and has a cam follower 545. The cam follower 545 is coupled to a raising/lowering cam 546, which is supported on the side of the frame 512 at a position along the excursion line of the intermediate table 523, thus permitting the transfer tool holder 541 to be suitably raised and lowered. Thus, when the cap holder 4 on the transfer tool holder 541 receives a cap 2 from the cap holding member 533, it approaches the recessed holding surface 533A of the cap holding member 533. Thus, the stability of reception can be improved.

Now, the method of position control of caps 2 by the cap position controller 530 will be described.

(1) Upstream the cap transfer position on the cap aligner/feeder 12, each cap holder 4 is transferred to the transfer tool holder 541 of the cap position controller 530 to be held therein.

(2) The compressed air ductline is then connected to the flow path 532A of the cap holding member 533 which functions as the rising stream former, and a rising stream of compressed air is formed in the vertical path 531A of the path forming member 531.

(3) Then, on the outlet side of the cap discharge path 518, the cap 2 that is received in a cap reception groove 516 of the turntable 514 is thrown by the transfer guide 516A into the path forming member 531. As a result, by the rising air stream, the cap 2 is floated in an position that its gravitational centroid is at a vertically lower position, i.e., its opening directed up (see FIG. 22A).

(4) After the lapse of a predetermined period of time, a vacuum ductline is connected to the flow path 532A of the cap holding member 533 by the switching operation of an electromagnetic switching valve or the like, thus stopping the rising stream of compressed air and at the same time vacuum sucking and supporting the cap 2 in the aligned state as noted above to and on the recessed support surface 533A of the cap holding member 533 (see FIG. 22B).

(5) The cap holding member 533 is inverted by 180 degrees by the inverter 534 (see FIG. 22C).

(6) The vacuum suction is stopped to release the cap 2 from the suction to the recessed holding surface 533A of the cap holding member 533. Further, if necessary, the compressed air ductline is connected to the flow path 532A and to the recessed holding surface 533A of the cap holding member 533 to forcibly separate the cap 2 from the recessed holding surface 533A of the cap holding member 533, whereby the cap 2 is transferred in a predetermined position, which is obtained by inversion of the aligned state noted above, to the cap holder 4 (see FIG. 22D).

The above cap aligner/feeder has the following functions.

Each of randomly supplied caps 2 is aligned to be directed substantially in a predetermined direction with their gravitational centroid at a vertically lower position and thus stabilized while floating in the rising air stream. When the rising air stream is subsequently stopped or decelerated, the cap 2 falls down vertically in its state aligned in the substantially predetermined direction noted above to be attracted to and held by the cap holding member 533.

After the operation described above, the cap holding member 533 is inverted, and further the cap 2 is released from the suction by the cap holding member 533. Thus, the cap 2 is transferred in the predetermined position as the inversion of the aligned position noted above to the cap holder 4 to be taken out.

With the above example, the following modifications are possible.

The rising stream former may be constructed by using a compressed air feed nozzle or the like separate from the article holding member instead of the flow path formed therein.

The compressed air flow path for the rising stream formation and the evacuating flow path for sucking article by vacuum suction need not be a common path, but it is possible to provide independent flow paths.

It is possible to use magnetic attraction instead of vacuum suction as means for causing article to be held on the article holding member. In this case, the article has to be provided with a magnetic member, which can be attracted by a magnet on the side of the article holding member.

The flow rate and pressure of the rising air stream formed by the rising air stream former are adjustable according to the size and weight of the article.

The cap 2 that can be used in carrying out the invention, may be of various types as exemplified in FIGS. 23A to 26B. The example of cap 2 shown in FIGS. 23A and 23B has a half sperical head b1 and a cylindrical body b2. The example of cap 2 shown in FIGS. 24A and 24B has a half spherical head b1 and an ellipsoidal frustum body b2. The example of cap 2 shown in FIGS. 25A and 25B has a substantially disk-like head b1 and a cylindrical body b2.

The embodiment described above has the following functions.

Since bottles 1 are held by bottle holders 3 as they are conveyed on a conveyor, they can be fed at a predetermined conveying speed and in a predetermined conveying position to the filling and cap fitting units 13 and 14. That is, the bottles 1 can be fed in a reliably timed relation to the operation cycle of the filling and cap fitting units 13 and 14. In addition, the bottles 1 are fed such that they reliably match the filling position in the filling unit 13 and also the cap fitting position in the cap fitting unit 14.

Since caps 2 are held by cap holders 4 as they are conveyed on a conveyor, they can be fed at a constant conveying speed and in a predetermined conveying position to the cap fitting unit 14. That is, the caps 2 can be fed in a reliably timed relation to the operation cycle of the cap fitting unit 14. Further, the caps 2 are fed such that they reliably match the cap fitting position in the cap fitting unit 14.

With the above functions, it is possible to improve the reliability and production control performance of the entire filling apparatus.

It is to be understood that the above embodiment is by no means limitative. For example, it is possible to deal with not only bottles but also bins, rectangular paper containers, etc. In addition, the closing member is not limited to the cap, but it may be plugs, lids, etc.

As has been described in the foregoing, according to the invention, for filling contents into containers and fitting closing members thereon, it is possible to feed the containers at a predetermined conveying speed and in a predetermined conveying position to the filling and cap fitting units while also feeding the closing members at a predetermined conveying speed and in a predetermined conveying position to the cap fitting unit.

Although the invention has been illustrated and described with respect to several exemplary embodiments thereof, it should be understood by those skilled in the art that the foregoing and various other changes, imissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. An article conveyor unit comprising:
   an article holder position regulating member extending along an article holder movement path;
   an article holder having a seating magnet, the article holder having a guide surface positionable in frictional contact with the article holder position regulating member; and
   an article holder positioning magnet disposed along the article holder movement path, the article holder positioning magnet exerting a magnetic action on the seating magnet of the article holder to position the guide surface of the article holder in forced contact with the article holder position regulating member as the article holder is conveyed along the article holder movement path.

2. An article conveyor unit according to claim 1, the seating magnet of the article holder and the article holder positioning magnet having poles which attract each other, the article holder positioning magnet having a center portion disposed along the article holder movement path, the center portion of the article holder positioning magnet nearer the article holder position regulating member than a center portion of the seating magnet of the article holder, wherein the magnetic action on the seating magnet of the article holder is a magnetic attractive action which positions and holds the guide surface of the article holder in contact with the article holder position regulating member as the article holder is conveyed along the article holder movement path.

3. An article conveyor unit according to claim 1, wherein the article holder position regulating member is an elongated member extending along the article holder movement path.

4. An article conveyor unit according to claim 3, wherein the article holder guide surface is one of four side surfaces, each surface subtends 90 degrees at its axis.

5. An article conveyor unit according to claim 1, the seating magnet of the article holder and the article holder positioning magnet having poles which repel each other, the article holder positioning magnet having a center portion disposed along the article holder movement path, the center portion of the article holder positioning magnet farther from the article holder position regulating member than a center portion of the seating magnet of the article holder, wherein the magnetic action on the seating magnet of the article holder is a magnetic repulsive action which positions and holds the guide surface of the article holder in contact with the article holder position regulating member as the article holder is conveyed along the article holder movement path.

6. An article conveyor unit according to claim 1, wherein the article holder position regulating member is an elongated member extending along the article holder movement path.

7. An article conveyor unit according to claim 6, wherein the article holder guide surface is one of four side surfaces, each surface subtends 90 degrees at its axis.

8. An article conveyor unit comprising:
a first conveying means having a first article holder movement path;
a second conveying means having a second article holder movement path disposed adjacent the first article holder movement path of the first conveying means in a transfer area;
an article holder position regulating member extending along the first and/or second article holder movement paths;
an article holder having a seating magnet; and
an article holder positioning magnet disposed along the first and second article holder movement paths, the article holder positioning magnet exerting a magnetic action on the seating magnet of the article holder to position the article holder into forced contact with the article holder position regulating member, wherein the article holder is transferred from the first article holder movement path of the first conveying means to the second article holder movement path of the second conveying means in the transfer area.

9. An article conveyor unit according to claim 8, wherein the first conveying means and second conveying means partially overlap each other in an overlap zone, the second conveying means includes an article holder drive magnet exerting a magnetic attractive action on the seating magnet of the article holder to transfer the article holder from the first conveying means to the second conveying means in the overlap zone, and a de-magnetizing magnet disposed on a side of the article holder drive magnet of the second conveying means in the overlap zone opposite the first conveying means to provide a magnetic attractive action on the article holder drive magnet of the second conveying means.

10. The article conveyor unit according to claim 9, wherein a pole area of the de-magnetizing magnet is greater than a pole area of the article holder positioning magnet.

11. An article conveyor unit according to claim 8, wherein the first conveying means is a first turntable having a plurality of article holder support sections, a portion of the first turntable extends along the first article holder movement path, the second conveying means is a second turntable having a plurality of article holder support sections, a portion of the second turntable extends along the second article holder movement path, wherein the article holder support section of the first turntable is meshable with the article holder support section of the second turntable at the transfer area.

12. An article conveyor unit according to claim 11, wherein the first turntable includes a first regulating member with U-shaped regulating surfaces disposed near a perimeter of the first turntable, and the second turntable includes a second regulating member with U-shaped regulating surfaces disposed near a perimeter of the second turntable, wherein the article holder position regulating member includes portions of the first and second regulating members disposed along the first and second article holder movement paths.

13. An article conveyor unit according to claim 11, wherein the article holder positioning magnet is disposed below the portion of the first turntable that extends along the first article holder movement path and below the portion of the second turntable that extends along the second article holder movement path.

14. An article conveyor unit according to claim 8, wherein the magnetic action is a magnetic attraction.

15. An article conveyor unit according to claim 8, wherein the first conveying means and second conveying means partially overlap each other in an overlap zone, and the second conveying means includes an article holder drive magnet exerting a magnetic attractive action on the seating magnet of the article holder to transfer the article holder from the first conveying means to the second conveying means in the overlap zone.

16. An article conveyor unit according to claim 9, wherein the demagnetizing magnet has a pole of opposing polarity directed toward the pole of the article holder positioning magnet.

17. A method of positioning and conveying an article holder having a seating magnet along a first article holder movement path of a conveyor unit, the method comprising steps of:
establishing a magnetic field along the first article holder movement path;
moving the article holder on a first conveyor means disposed substantially along the first article holder movement path; and
exerting a magnetic action on the seating magnet of the article holder to position a guide surface of the article holder into frictional contact with a first article holder position regulating member extending along the first article holder movement path.

18. A method according to claim 17, further comprising a step of establishing the magnetic field between the article holder and the first article holder position regulating member, wherein the step of exerting a magnetic action on the seating magnet of the article holder comprises a step of exerting a magnetic attractive action on the seating magnet of the article holder which positions and holds the guide surface of the article holder in contact with the first article holder position regulating member.

19. A method according to claim 17, wherein the step of exerting a magnetic action on the seating magnet of the article holder comprises a step of exerting a magnetic repulsive action on the seating magnet of the article holder which positions and holds the guide surface of the article holder in contact with the first article holder position regulating member.

20. A method according to claim 17, further comprising steps of transferring the article holder from the first conveying means to a second conveying means at a transfer area, the second conveying means disposed substantially along a second article holder movement path, and exerting a magnetic action on the seating magnet of the article holder to position the guide surface of the article holder into frictional contact with a second article holder position regulating member extending along the second article holder movement path, wherein the step of exerting a magnetic action on the seating magnet of the article holder comprises a step of exerting a magnetic attractive action on the seating magnet of the article holder to position the guide surface of the article holder into frictional contact with the first and second article holder position regulating members extending along the first and second article holder movement paths.

* * * * *